US008813729B2

(12) United States Patent
Diem et al.

(10) Patent No.: US 8,813,729 B2
(45) Date of Patent: Aug. 26, 2014

(54) CHARGE AIR DUCT FOR AN INTERNAL COMBUSTION ENGINE

(75) Inventors: Johannes Diem, Weissach (DE); Rolf Mueller, Steinheim (DE); Gunther Hentschel, Uhingen (DE); Bernhard Huurdeman, Freiberg a.N. (DE); Karl-Ernst Hummel, Bietigheim-Bissingen (DE); Ulrich Dehnen, Kornwestheim (DE); Achim Rehmann, Kieselbronn (DE)

(73) Assignees: Behr GmbH & Co. KG, Stuttgart (DE); Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/274,693

(22) Filed: Oct. 17, 2011

(65) Prior Publication Data

US 2012/0097136 A1    Apr. 26, 2012

Related U.S. Application Data

(63) Continuation of application No. PCT/EP2010/002247, filed on Apr. 12, 2010.

(30) Foreign Application Priority Data

Apr. 17, 2009  (DE) .......................... 10 2009 017 555
Jun. 10, 2009  (DE) .......................... 10 2009 025 036
Mar. 12, 2010  (DE) .......................... 10 2010 011 372
Mar. 12, 2010  (DE) .......................... 10 2010 011 373

(51) Int. Cl.
*F02M 35/10* (2006.01)
*F02B 29/04* (2006.01)

(52) U.S. Cl.
USPC ............................................ 123/542; 123/563

(58) Field of Classification Search
USPC ................................................... 123/542, 563
See application file for complete search history.

(56) References Cited

U.S. PATENT DOCUMENTS

| 5,911,212 | A | 6/1999 | Benson |
| 6,006,730 | A | 12/1999 | Rutke et al. |
| 6,868,840 | B2 | 3/2005 | Lewallen |
| 7,971,576 | B2 | 7/2011 | Reuss et al. |
| 2002/0195086 | A1 | 12/2002 | Beck et al. |
| 2003/0037913 | A1* | 2/2003 | Knecht et al. ............... 165/122 |

(Continued)

FOREIGN PATENT DOCUMENTS

| DE | 42 40 239 A1 | 6/1994 |
| DE | 103 43 756 A1 | 4/2004 |

(Continued)

*Primary Examiner* — M. McMahon
(74) *Attorney, Agent, or Firm* — Muncy, Geissler, Olds & Lowe, P.C.

(57) ABSTRACT

A charge air duct for an internal combustion engine includes a housing with at least one entrance and at least one exit for charge air. A heat exchanger is arranged inside the housing to cool the charge air, a bypass is arranged on the housing to at least partially circumvent the heat exchanger and an actuator is arranged on the housing to influence the charge air flow. The charge air is guided from the entrance to the heat exchanger in a first position of the actuator and from the entrance to the bypass in a second position of the actuator, and the actuator at least partially reduces a cross-section of the charge air in a third position.

28 Claims, 17 Drawing Sheets

(56) References Cited

U.S. PATENT DOCUMENTS

| | | | |
|---|---|---|---|
| 2004/0244782 A1* | 12/2004 | Lewallen | 123/568.12 |
| 2005/0005919 A1* | 1/2005 | Tyler | 123/563 |
| 2005/0051145 A1 | 3/2005 | Joyce et al. | |
| 2006/0151157 A1* | 7/2006 | Kammler | 165/173 |
| 2008/0149080 A1* | 6/2008 | Reuss et al. | 123/568.12 |
| 2009/0013977 A1* | 1/2009 | Brecheisen, II | 123/563 |
| 2009/0020079 A1 | 1/2009 | Muller et al. | |
| 2009/0050117 A1* | 2/2009 | Tai et al. | 123/542 |
| 2009/0071450 A1 | 3/2009 | Doring et al. | |
| 2010/0132355 A1* | 6/2010 | Michels et al. | 60/605.1 |
| 2010/0263375 A1 | 10/2010 | Grieve | |
| 2011/0000469 A1 | 1/2011 | Lauberts et al. | |

FOREIGN PATENT DOCUMENTS

| | | |
|---|---|---|
| DE | 10 2006 009 298 A1 | 9/2007 |
| DE | 10 2006 057 488 A1 | 6/2008 |
| DE | 10 2007 040 661 A1 | 3/2009 |
| DE | 10 2007 043 992 A1 | 3/2009 |
| DE | 10 2008 006 049 A1 | 7/2009 |
| DE | 10 2008 008 697 A1 | 8/2009 |
| DE | 10 2008 032 388 A1 | 1/2010 |
| EP | 1 512 853 A2 | 3/2005 |
| EP | 1 845 242 A2 | 10/2007 |
| EP | 2 048 416 A2 | 4/2009 |
| EP | 2 161 429 A2 | 3/2010 |
| FR | 2 916 020 A1 | 11/2008 |
| FR | 2 920 853 A1 | 3/2009 |
| JP | 60050225 A | 3/1985 |
| JP | 61-61916 A | 3/1986 |
| WO | WO 2005/019619 A1 | 3/2005 |
| WO | WO 2007/097750 A1 | 8/2007 |

* cited by examiner

CHARGE AIR DUCT FOR AN INTERNAL COMBUSTION ENGINE

This nonprovisional application is a continuation of International Application No. PCT/EP2010/002247, which was filed on Apr. 12, 2010, and which claims priority to German Patent Applications No. DE 10 2009 017 555.5, which was filed in Germany on Apr. 17, 2009, DE 10 2009 025 036.0, which was filed in Germany on Jun. 10, 2009, DE 10 2010 011 372.7, which was filed in Germany on Mar. 12, 2010, and DE 10 2010 011 373.5, which was filed in Germany on Mar. 12, 2010, and which are all herein incorporated by reference.

BACKGROUND OF THE INVENTION

1. Field of the Invention

The invention relates to a charge air duct for an internal combustion engine.

2. Description of the Background Art

DE 10 2007 040 661 A1 describes an intake manifold for an internal combustion engine having an integrated heat exchanger through which a coolant flows for cooling charge air. A charge air flow can be conducted through the heat exchanger or a bypass duct in an adjustable manner by means of a first control flap. A second, separate regulating flap additionally fulfills the function of a throttle blade.

SUMMARY OF THE INVENTION

A first embodiment of the invention comprises a charge air duct having a heat exchanger for cooling the charge air, wherein this duct allows for an adaptation to various operating situations using simple means. By integration of various functions, the charge air routing can be adapted to various operating conditions using only a single control element. In the case of a diesel engine, these are, in particular, normal operation (exhaust gas routed via the heat exchanger), cold start operation (exhaust gas routed via the bypass) and throttle operation (for example for regenerating a particulate filter and/or shutting off the engine). Charge air within the meaning of the invention shall be understood as compressed air, both with and without admixed quantities of recirculated exhaust gas. The invention finds particular applicability in diesel engines, but can also be employed for gasoline engines or other internal combustion engines, depending on the requirements.

In one embodiment of the invention, the charge air duct is designed as an intake manifold of the internal combustion engine. A compact, integrated unit comprising the heat exchanger and control element is thus created, which can be directly attached to a cylinder head of the engine and allows cooling and, depending on the operating mode, various ways of charge air routing.

In another embodiment, the control element is disposed in a duct that may be substantially cylindrical, and optionally, in addition, the charge air flow is diverted by approximately 90° in the region of the duct. Such an arrangement of the control element allows for large charge air throughputs with a small, space-saving design.

In a further embodiment of the invention, the control element is designed as a roll that can be rotated about an axis. This allows a compact and reliable configuration. The roll can be designed, for example, as a hollow roll, wherein the charge air flow enters the roll in the axial direction and exits through a radial opening in the roll wall. Depending on the position of the roll in the sense of rotation, the opening overlaps fully, partially, or not at all with a feed element to the heat exchanger, or an opening of the bypass.

It is also envisioned that the control element may have a blocking surface, wherein the blocking surface has a geometric structure so as to reduce the passage cross-section. Such a geometric structure can be designed, for example, as a serrated edge of the control element, for example an edge of the opening of a hollow roll, or as defined perforations in the region of the edge. The wall of the hollow roll then forms the blocking surface. The passage cross-section can thus notably be adjusted with precision by means of the control element. Moreover, it is possible for the geometric structure to create a non-linear relationship between the passage cross-section and a movement of the control element. Such measures also make the control element particularly suitable for use as a throttle blade of a gasoline engine, which is generally subject to particularly high requirements in terms of the precision of the passage cross-section that is adjusted.

In a further embodiment of the invention, the housing comprises a diverting region for the U-shaped diversion of the charge air, wherein the diverting region may be arranged downstream of the heat exchanger and upstream of an additional heat exchanger. In addition to good usage of the installation space available in the engine compartment, the charge air cooling can have a two-stage design as a result of separate heat exchangers. As an alternative, the heat exchanger and the additional heat exchanger can also be varying sections of a single heat exchanger.

It is possible for the housing to be composed of at least two housing parts. The housing parts can be welded to each other after assembly, or screwed together, or fixed to each other in another manner. The housing parts can optionally be made of a synthetic material, such as a polyamide.

As another variation, a tie rod may be provided on the housing, wherein the tie rod effects a reinforcement of a housing wall in the region of a gasket of the control element. This prevents leakage in the region of the gasket, even with vibrations and/or high temperatures and pressures.

In another embodiment, the control element is slidingly seated against at least one gasket so as to prevent a leakage current of the charge air by way of a path that is undesirable, depending on the position of the control element. The gasket can be integrally cast with the housing.

It is sometimes useful for the housing to have a multi-wall design, at least in some sections, wherein coolant flows between the housing walls in a possible detailed design. As an alternative or in addition to a coolant flowing through, a heat shield, for example made of metal, can be provided. In general, this allows for the use of cost-effective synthetic materials, such as polyamides, for the housing, even with charge air temperatures exceeding 200° C. in certain regions.

In a further embodiment of the invention, the housing can be fixed to the internal combustion engine by way of two, notably parallel, rows of screw connections, wherein at least one of the screw connections passes through a part of the housing. Thus, fixation to the flange of the internal combustion engine on the gas inlet side, for example, is possible, with particularly low stress.

In a variant embodiment, the heat exchanger is disposed between the parallel rows of screw connections so that it is arranged in a space-saving manner and supported well against vibrations.

In still another embodiment of the invention, moreover an additional heat exchanger is provided, so that optimal adjustment to the installation space is possible with a predefined cooling power. As a first variation, the additional heat exchanger is likewise disposed between the rows of screw connections, so that overall a particularly stable and compact arrangement exists. Depending on the requirements in terms of the installation space, however, the second heat exchanger can also be disposed outside of the rows of screw connections, for example above an upper screw connection row or below a lower screw connection row. In addition, this allows for a larger construction height of the heat exchanger disposed outside of the screw connection rows. In general, it may be useful in all the aforementioned arrangements if no screw connection passes through the region of the net or the active cooling surface of a heat exchanger, because this is rather complex to implement for many heat exchanger designs.

With modifications that may be possible depending on the installation space requirements, the heat exchangers can have either varying lengths or the same length transversely to the flow direction. The same length is useful in terms of a common part design and for balancing the flow resistance at the heat exchangers. A design having varying heat exchanger lengths allows the existing installation spaces to be utilized particularly well.

In the interest of a compact, short design, it is may be useful for the charge air flow to undergo a diversion, notably by 180°, after the upstream one of the two heat exchangers and before the downstream one of the two heat exchangers. In variation, the charge air flow can undergo another diversion after the downstream one of the two heat exchangers. This can be done in the manner of routing that is curved around the control element and the diversion may be at least 90°. The sequence of diversions can overall form, for example, a U-flow heat exchanger or an S-flow heat exchanger. The sense of rotation of the diversions of the charge air flow can change its sign in the two aforementioned ways over the course of the charge air duct, whereby good mixing of the air leaving the heat exchangers is achieved, with a small or almost non-existent drop in pressure.

In various embodiments of the invention, the number of screw connections is either four, which is useful for the connection to a three-cylinder engine, or five, which is useful for the connection to a four-cylinder engine. The number of screw connections is thus kept small, wherein this also provides for stress-free and secure mounting of the charge air duct to the internal combustion engine.

For simple and secure assembly, a cavity is produced from the same material and integrally with the housing, for the screw connection that passes through the housing. Depending on the installation space, the cavity can be designed in the manner of a groove or a tunnel, wherein both variants can also be present on the same charge air duct. Such a cavity can be produced in the course of an injection molding method, which is used to produce a part of or the entire housing from synthetic material. In principle, a different housing material than a synthetic material is conceivable, for example aluminum.

In an embodiment, the heat exchanger comprises a stack of flat tubes, wherein a cooling fluid flows through, and the charge air flows around, the flat tubes. The flat tubes can be disposed approximately between an upper and a lower box. Both connections for the coolant flowing through the flat tubes are provided on one of the boxes. Flat tubes, fins that may optionally be provided between the flat tubes, boxes and, depending on the requirements, coolant connections can be brazed together in a brazing furnace to form, together, a cassette-like aluminum heat exchanger.

In an embodiment, a throttle member is provided in addition to the control element. It is useful for the throttle member to adjust complete blockage of the charge air. Such complete blockage can be used, for example, to safely shut down a diesel engine. Moreover, the throttle member can have act supportively in the partial-load operating range so as to provide sufficient negative pressure, for example for exhaust gas recirculation. In general, the possibility of severe throttling or complete blockage of the charge air flow by the control element can be dispensed with on the part of the control element, whereby the design complexity with respect to sealing the control element is reduced. Notably when configuring the control element in a roll shape, the design thereof can be kept simple.

In another embodiment of the invention, the throttle member comprises an electrically controllable actuator, which is provided in addition to an electrically controllable actuator of the control element. The electrically controllable actuators of the throttle member and control element may be directly coupled to each other electrically for this purpose. Separate control, such as by way of a control signal bus, can thus be dispensed with, whereby, for example, an output stage can be foregone. Such electric coupling can be done in a simple manner, for example, by means of a contact switch. When a closed position (or opening) of the control element is reached, for example, the contact switch could be overrun (or released), so that the actuator of the throttle member is thus directly actuated for the purpose of completely closing (opening) the throttle member.

In an alternative embodiment of the invention, the throttle member and the control element are connected to each other by way of a coupling mechanism. A separate drive or actuator of the throttle member can thus be dispensed with. The coupling mechanism transmits, for example, a displacement of the control element by means of sliding blocks, arms, shafts and/or other mechanical elements to the throttle member. The mechanism can be designed, for example, such that only a final travel section over the course of a closure of the control element results in closure of the throttle member, while the throttle member remains open for the predominant part of a displacement of the control element.

Stated in very general terms, any arbitrary arrangement may be present with respect to driving the adjustments of the control element and throttle member, depending on the requirements, notably by means of two separate electric actuators, by means of one or two mechanical actuators (such as vacuum actuator), or by means of a, notably electric, actuator comprising an aforementioned coupling mechanism.

In a further embodiment of the invention, an additional heat exchanger is provided downstream of the heat exchanger, wherein in the second position, the charge air is routed through the bypass, circumventing the heat exchanger, and subsequently flows through the additional heat exchanger. The heat exchanger may be a high-temperature heat exchanger, and the additional heat exchanger may be a low-temperature heat exchanger. Typically, engine coolant having conventional operating temperatures, such as 90° C., flows through a high-temperature heat exchanger, while colder coolant, such as from a low-temperature branch of the cooling system, flows through the low-temperature heat exchanger. Overall, this prevents the charge air from initially being heated by the first heat exchanger at operating conditions such as a partial-load operating range with an engine that is at the operating temperature. In the partial-load operating range, it is quite possible for the charge air to leave the supercharger at temperatures below the primary coolant temperature, or below 90° C. The efficiency of charge cooling, and hence of the internal combustion engine, can thus be improved in the partial-load operating range.

A possible, but not necessary embodiment of the invention comprises the charge air duct exclusively comprising a bypass that is routed such that the charge air is always routed at least through the additional heat exchanger.

In a further possible embodiment comprising two heat exchangers, in a fourth position of the control element, the charge air may be routed to a second bypass from the inlet, with the second bypass joining downstream of the additional heat exchanger. It is thus possible to adjust a complete circumvention of the heat exchangers or charge air cooling at corresponding operating conditions, such as during a cold start. It may be useful for this to be done in conjunction with exhaust gas recirculation, so that a development of condensate on the heat exchangers can be avoided, which is undesirable under cold start conditions.

Depending on the requirements in turns the installation space, in one embodiment comprising two heat exchangers, the control element can be disposed substantially in one plane with the two heat exchangers, moreover notably in one plane with the outlet of the charge air duct. In such an arrangement, the design of the screw connections for fixing the charge air duct to the internal combustion engine can be implemented particularly easily.

In an alternative embodiment thereto, it is also possible for the two heat exchangers and the outlet to be disposed substantially in one plane, wherein the control element is disposed outside of this plane, notably completely above or completely below the plane. Such a configuration is compact and short, so that the installation space available in many cases for a charge air duct, in addition to the internal combustion engine, can be optimally used.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
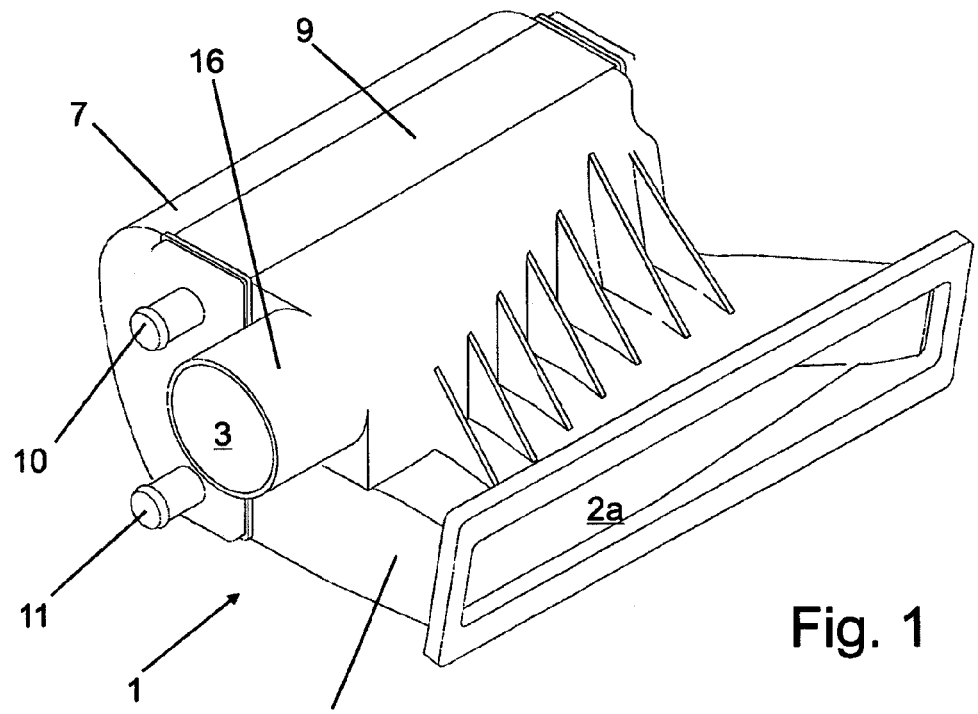
FIG. 1 shows a schematic spatial illustration of a charge air duct according to the invention.

The charge air duct according to the invention pursuant to FIG. 1 to FIG. 5 is designed as an intake manifold of an internal combustion engine, in which a housing 1 of the charge air duct which is made of polyamide encloses a collector region 2, which is flange-mounted by a charge air outlet 2a to a cylinder head of an internal combustion engine, in the present case a diesel engine.

The housing 1 has an inlet 3, into which the charge air flows, which is compressed by a compressor, such as an exhaust gas turbocharger, and heated. In the present example, the inlet 3 has a circular cross-section and extends into a cylindrical duct 16 in which a control element 4 is positioned, which is shaped in the manner of a roll. The control element 4 comprises a wooden roll, which can be rotated by way of an actuator (not shown) and in the wall of which an opening 5 is provided. The wall of the wooden roll 4 represents a radially oriented outlet opening for the charge air, which initially, after entering the housing, flows axially into the wooden roll 4 and then leaves the wooden roll 4 through the opening 5 after being substantially diverted by 90°.

A plurality of passages 12, 13 are provided in the cylindrical duct 16, which overlap with the opening 5, depending on the rotational position. So as to prevent leakage currents of charge air, additionally a plurality of gaskets 14 are disposed in the wall of the cylindrical duct 16, which in the present example are designed as sealing strips that are integrally cast with the housing material.

So as to lend the housing 1, and notably the positions of the gaskets 14, sufficient stability with respect to the charge air pressure and other influences, additionally a tie rod 15 is provided on the housing 1 in the vicinity of the cylindrical duct 16.

Figure 2:
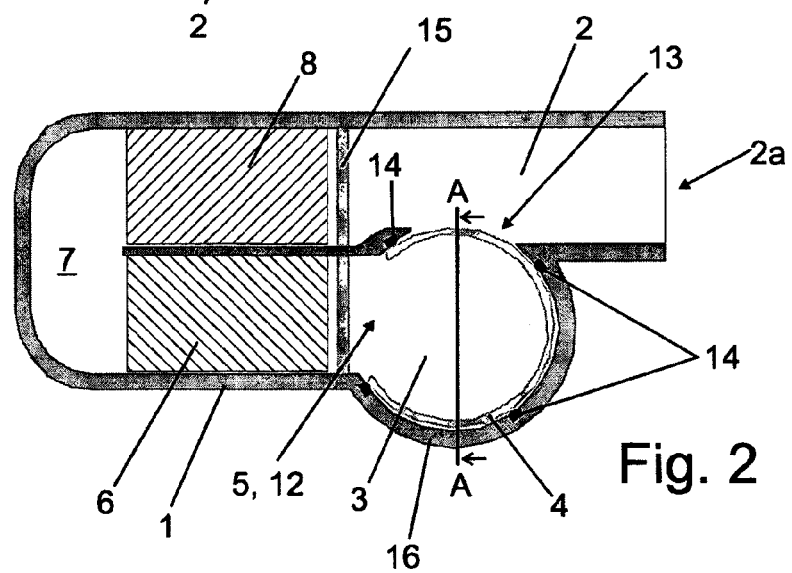
FIG. 2 shows a schematic sectional view of the charge air duct of FIG. 1 in a first position of a control element.
Figure 3:
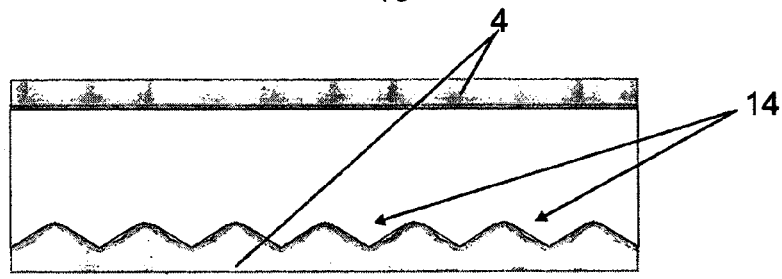
FIG. 3 shows a sectional view along line A-A of FIG. 2.

In a first position of the control element according to FIG. 2, the opening 5 overlaps with a first passage 12 in the housing 1. The charge air thus flows out of the opening 5 of the control element 4 to a liquid-cooled heat exchanger 6, which is disposed in the housing 1 and which is followed by a diverting region 7 and, following a diversion by 180°, by another heat exchanger 8. Thermal energy of the charge air is released to the cooling fluid of the heat exchangers during the flow through the heat exchangers 6, 8.

In the present example (see FIG. 1), the heat exchangers 6, 8 are designed as varying regions or sections of a single heat exchanger insert 9, which comprises only an inflow 10 and an outflow 11 for cooling fluid. As an alternative, however, it is also possible to provide two separate heat exchangers, each having an inflow and an outflow for the same cooling fluid, or for different cooling fluids. The separate heat exchangers can thus be operated notably with cooling fluids having temperatures that are different from each other so as to increase the efficiency of the charge air cooling. The configuration of the charge air duct with respect to the heat exchangers can also be referred to as a U-flow cooler.

After it exits the additional heat exchanger 8, the charge air flows through the collector region 2 and then enters the internal combustion engine.

Figure 4:
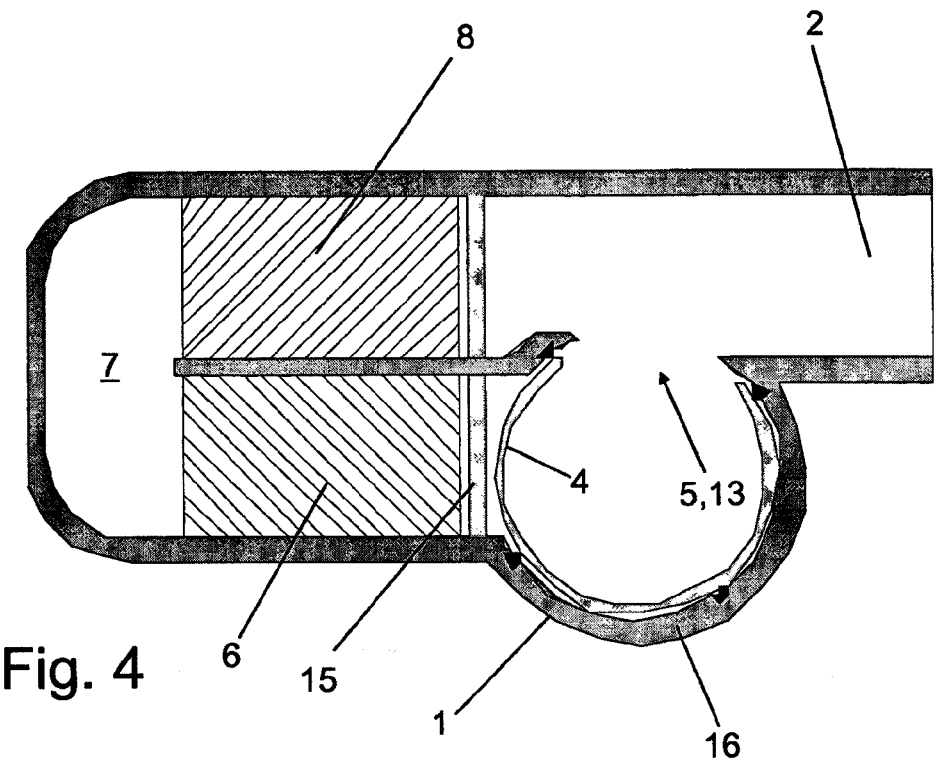
FIG. 4 shows the charge air duct of FIG. 2 in a second position of a control element.

In a second position of the wooden roll 4 according to FIG. 4, the path to the first passage 12 is closed by the wall of the wooden roll, which serves as a blocking surface, and the opening 5 overlaps with a second passage 13, which is provided as a bypass in a wall of the collector region 2 which adjoins the cylindrical duct 16. In this position, the charge air thus flows directly from the inlet 3 through the wooden roll 4 into the collector region 2, so that no cooling by the heat exchangers 6, 8 takes place. Such an operating mode is selected, for example, during a cold start phase so as to allow the operating temperature of the internal combustion engine to be reached quickly.

Notably, a content of recirculated exhaust gas can be admixed to the charge air. The exhaust gas can be admixed prior to entry into the charge air duct according to the invention, or directly in the charge air duct (not shown).

Figure 5:
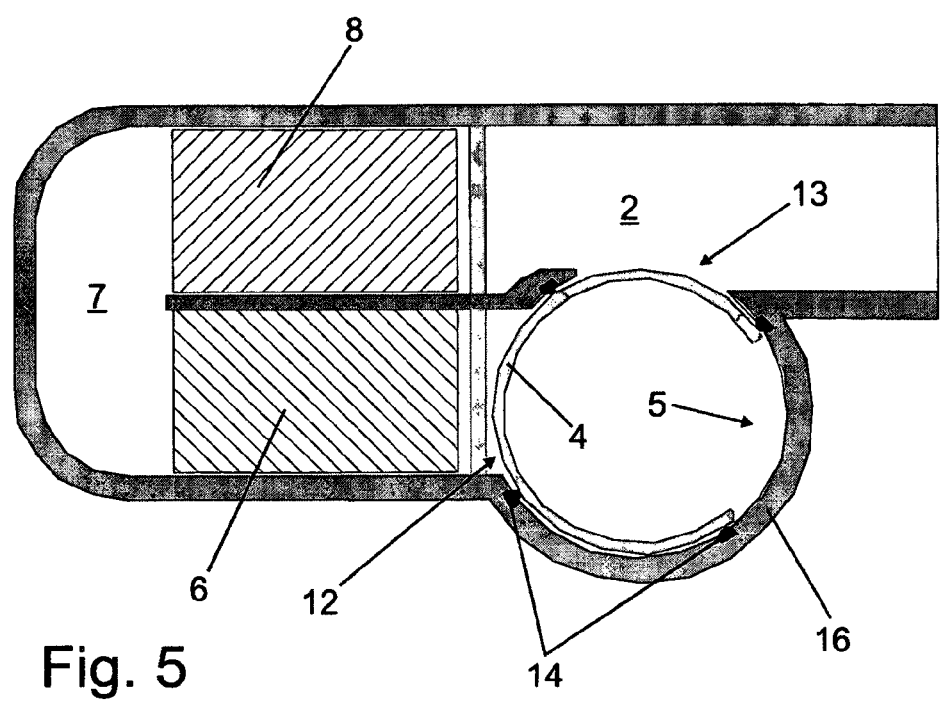
FIG. 5 shows the charge air duct of FIG. 2 in a third position of a control element.
Figure 6A:
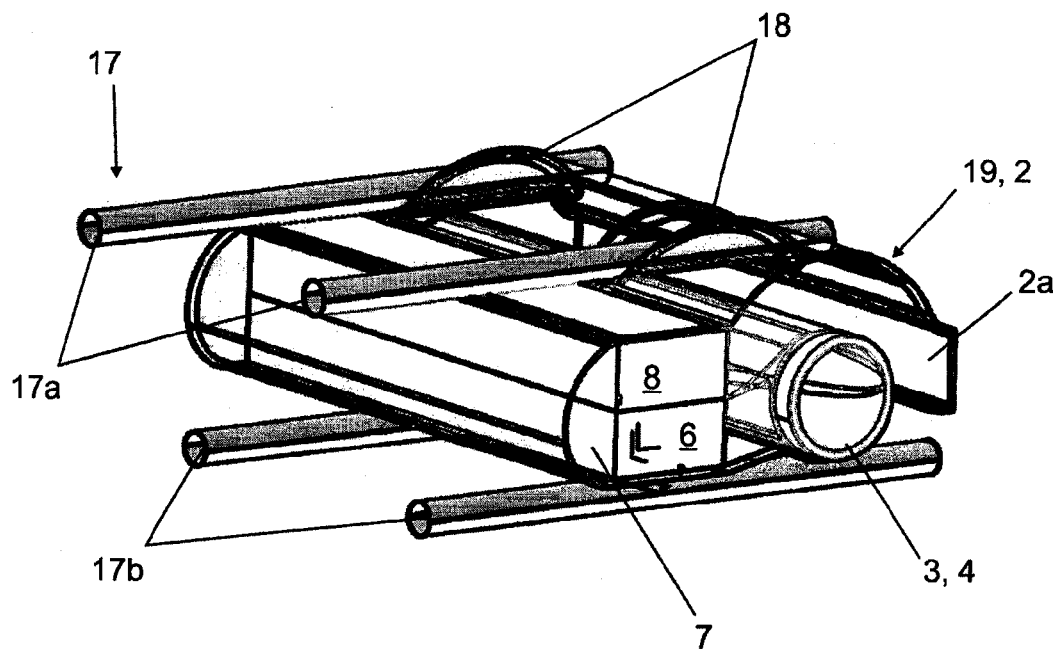
FIGS. 6a to 6d show an additional embodiment of the invention in a spatial view and in top views, from the side, the front and the back.
Figure 6B:
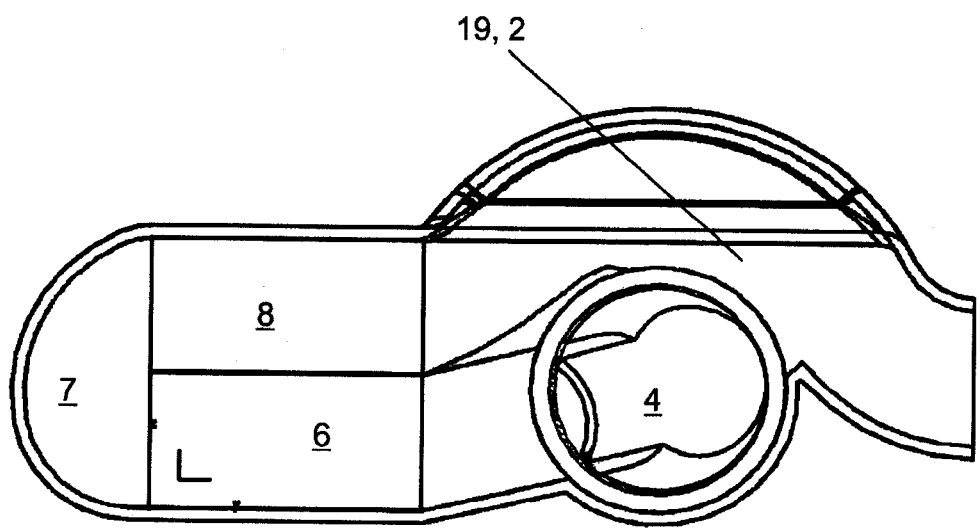
Figure 6C:
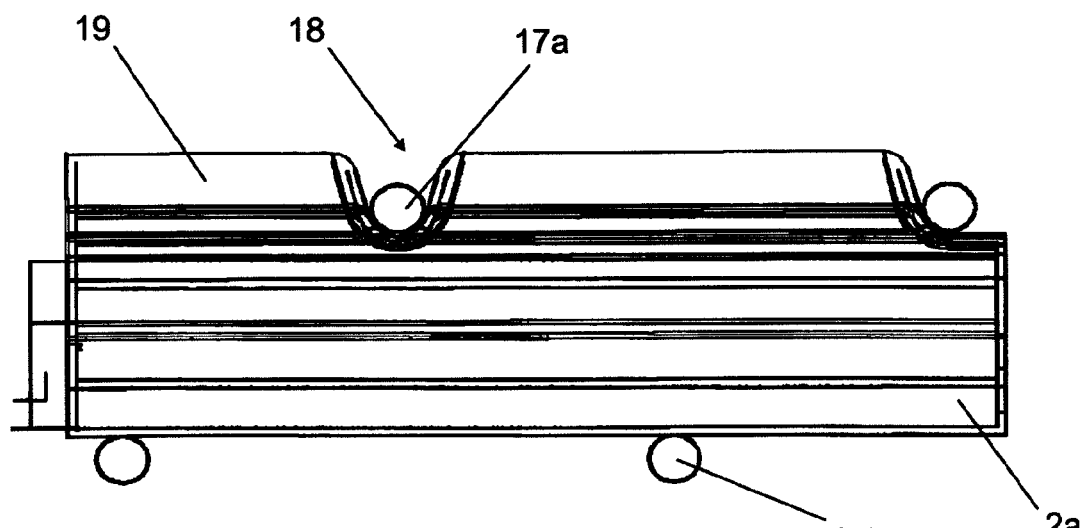
Figure 6D:
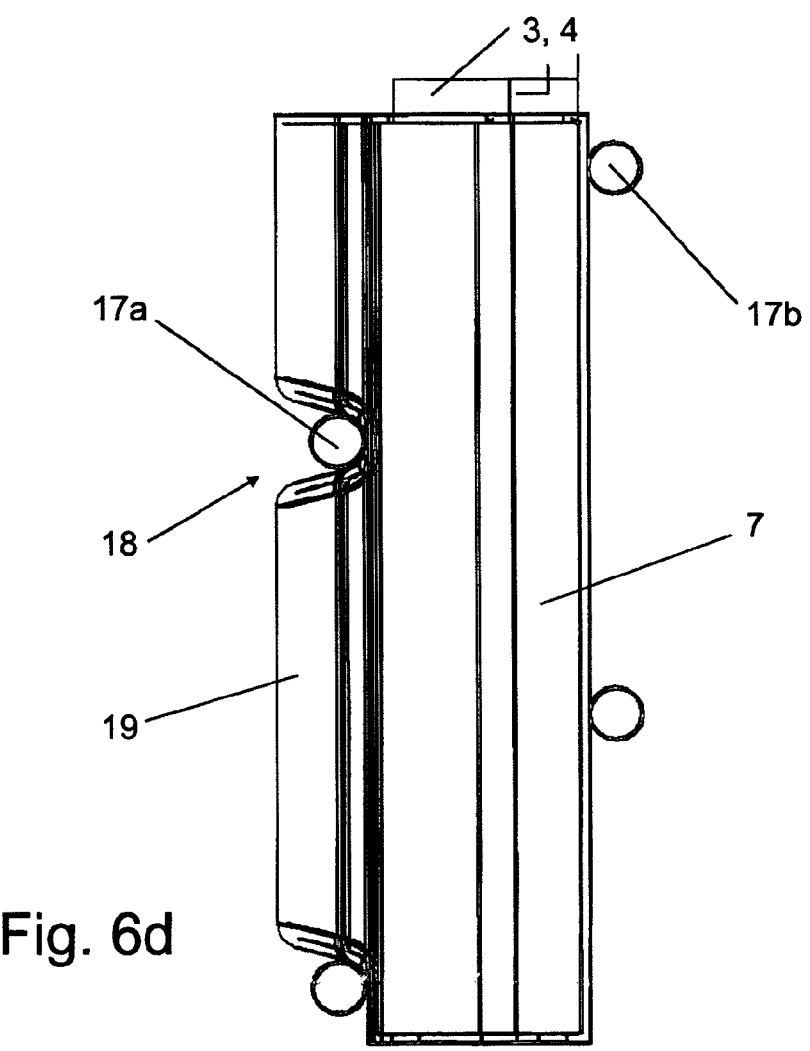
Figure 7A:
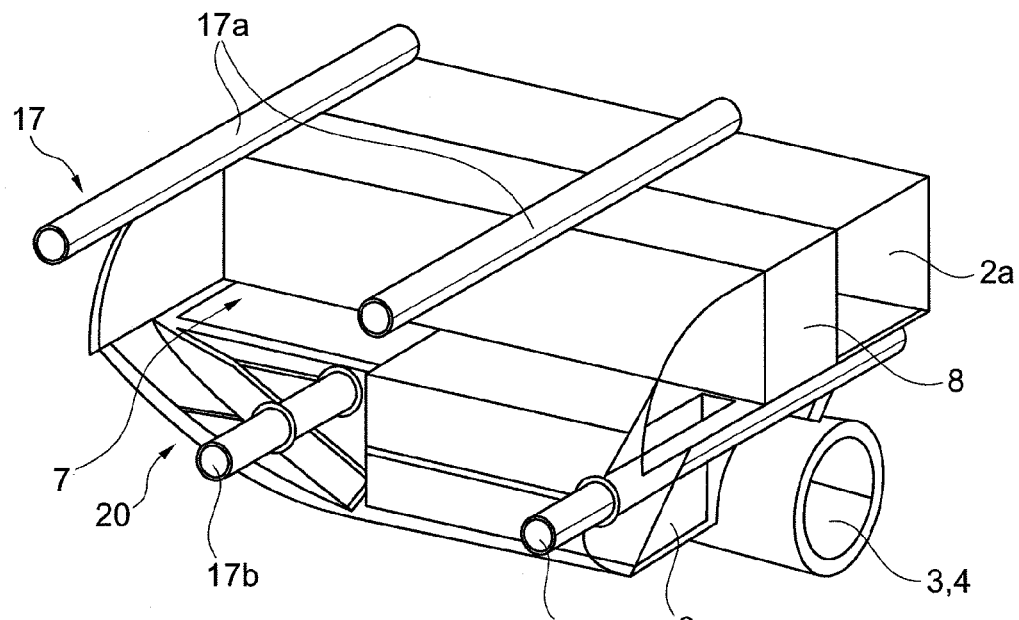
FIGS. 7a to 7d show an additional embodiment of the invention in a spatial view and in top views, from the side, the front and the back.
Figure 7B:
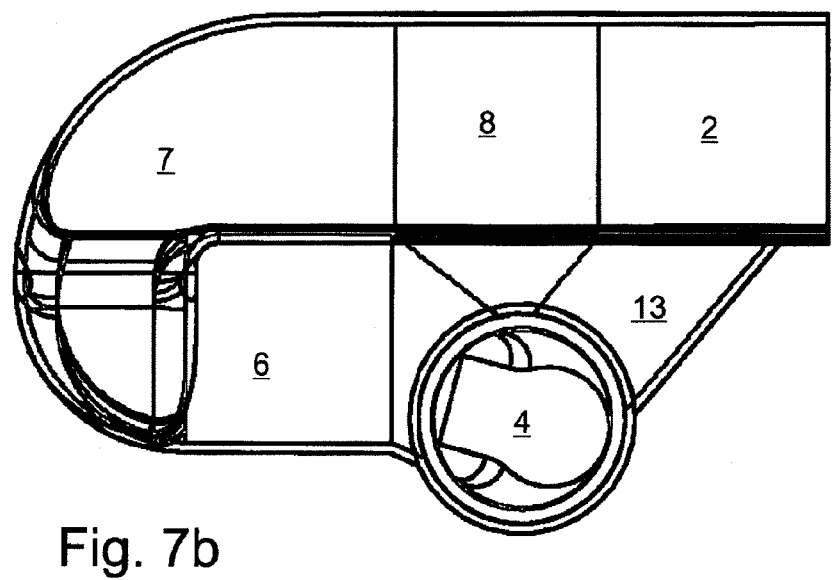
Figure 7C:
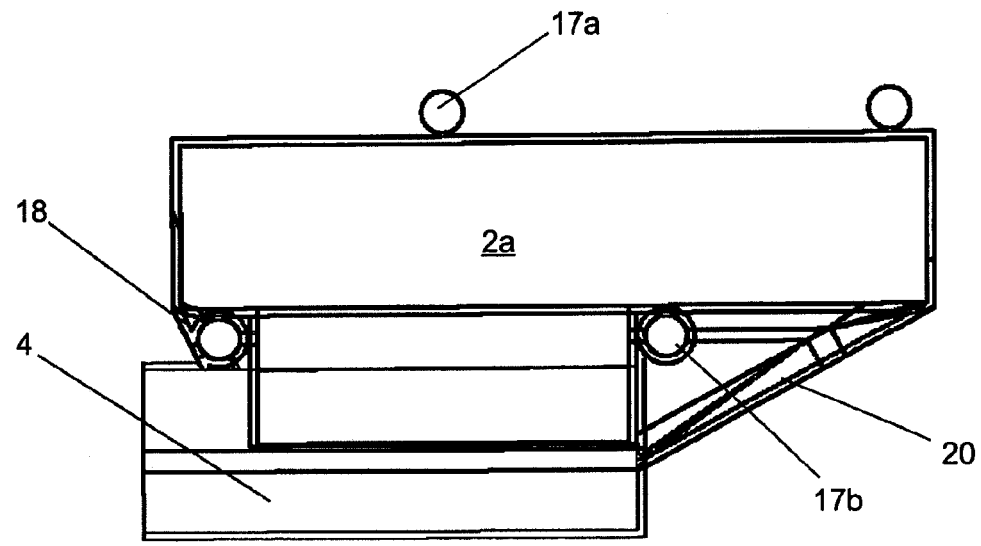
Figure 7D:
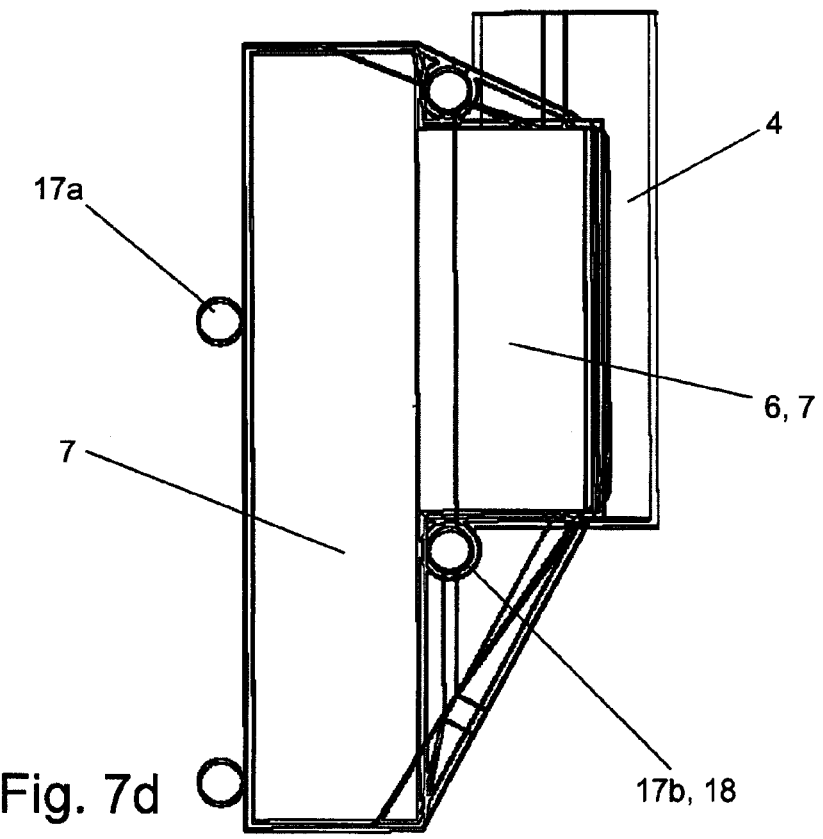
Figure 8A:
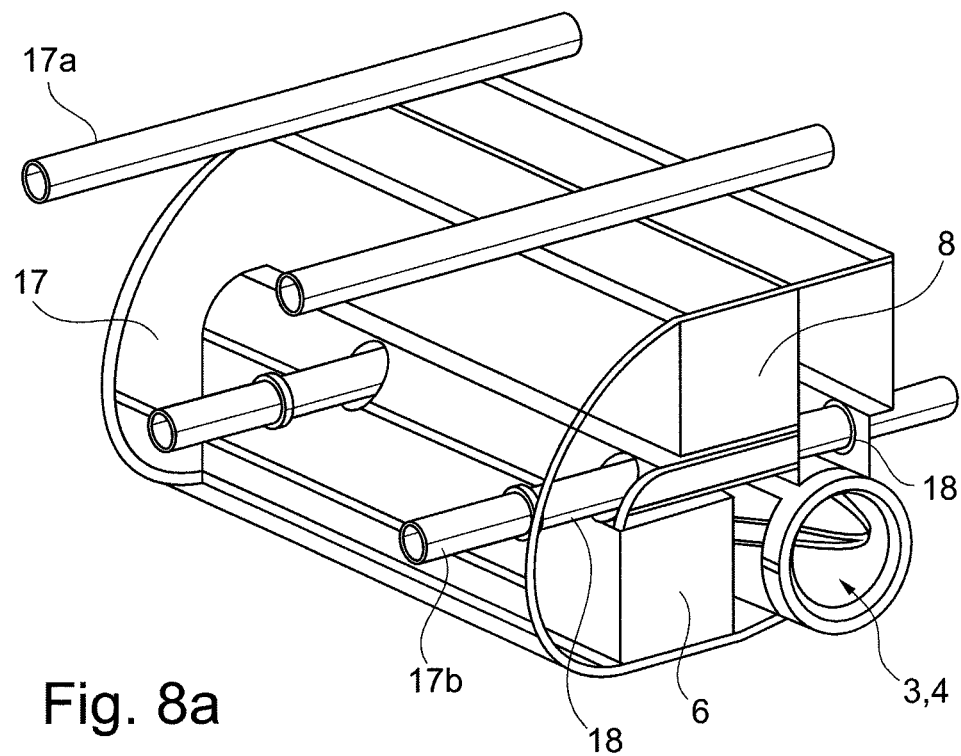
FIGS. 8a to 8d show an additional embodiment of the invention in a spatial view and in top views, from the side, the front and the back.
Figure 8B:
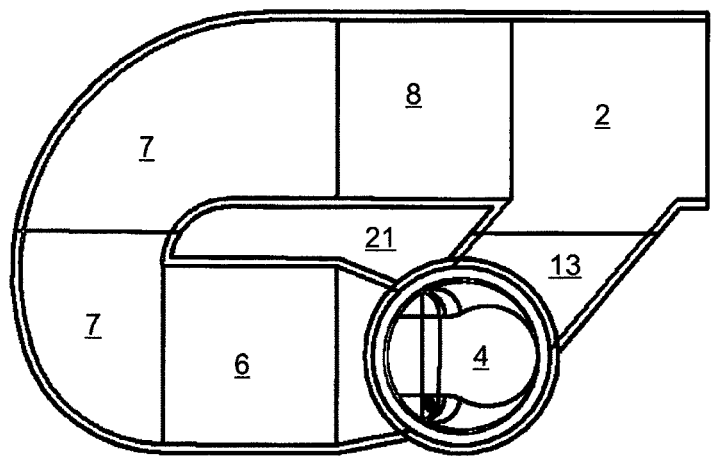
Figure 8C:
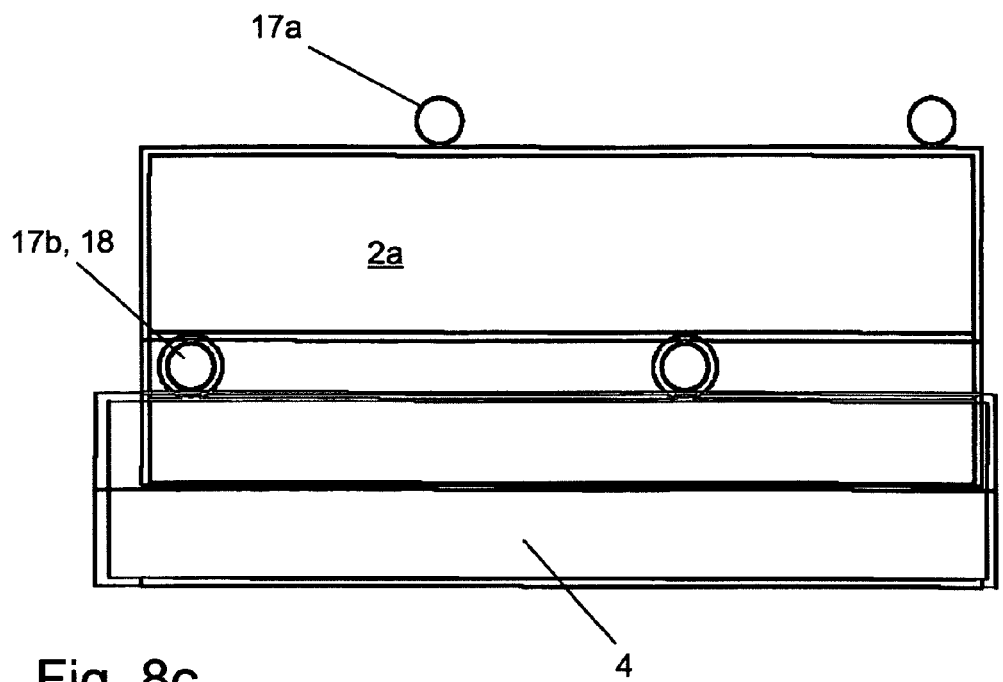
Figure 8D:
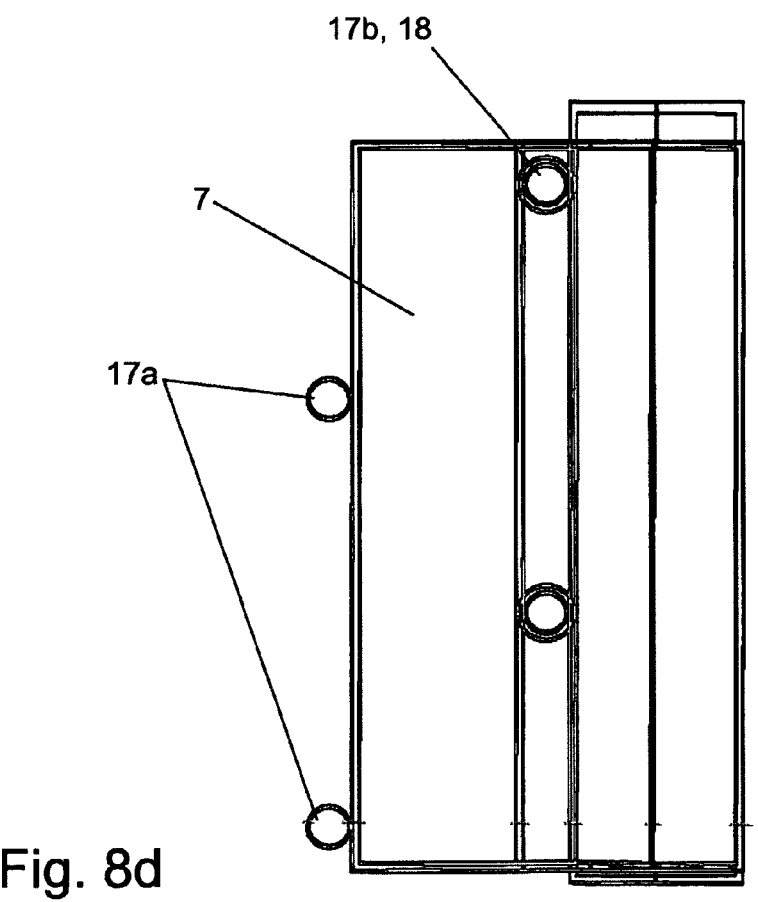

In a third position of the wooden roll 4 according to FIG. 5, the opening 5 is located opposite of the wall of the cylindrical duct 16, so that the passage cross-section for the charge air is completely closed or completely reduced.

In an intermediate position, which is not shown, the opening 5 can overlap only partially with the first passage, or with the second passage 13, so that an adjustable, continuous reduction of the passage cross-section or adjustable throttling of the charge air flow is achieved. So as to ensure high accuracy of the adjustment, the blocking surface or wall of the wooden roll adjacent to the opening 5 does not have a smooth edge, but rather a geometric structure in the form of a serration 14 (see FIG. 3). The serration can additionally be angled toward the roll center to prevent the roll 4 from snagging on the housing 1 during rotation.

The use of a roll-type throttle can also be of interest for gasoline engines given the installation space constraints, however for this purpose, more precise throttling, such as by way of larger toothing, should be possible. The position of the open bypass can be eliminated here, because the advantages for consumption cannot be readily measured.

During operation, the roll 4 is rotated clockwise from the "open throttle blade with charge air cooling" position (FIG. 2) to the "bypass open" position (FIG. 4) to the "throttle blade closed" position (FIG. 5) as shown in the drawings. The option of throttling by not using the bypass channel can be achieved, starting from the position according to FIG. 2, by a counterclockwise rotation.

All of the exemplary embodiments according to FIG. 6a to FIG. 9 described hereafter share the common feature that two rows of screw connections 17, which in the present example are parallel, are provided for the mounting to the cylinder head of a three-cylinder engine, which is to say two upper screw connections 17a and two lower screw connections 17b. Each of the screw connections is shown in the figures as a cylindrical duct having a defined length, with only the required space thereof being shown. The screws or tie rods used to fix the charge air duct to the cylinder head are not shown.

The two parallel rows of screw connections have a distance of 90 mm (distance of duct centers) in the present example.

The outside diameter of the wooden roll 4 is very similar in the exemplary embodiments and ranges between 60 mm and 65 mm in each case.

As in the first exemplary embodiment, each of the four exemplary embodiments in FIG. 6a to FIG. 9 comprises a first heat exchanger 6 and a second heat exchanger 8, between which the charge air is diverted in a diverting region 7. A first passage 12 and a second passage or bypass 13 are also present in each case, and the basic function of the control element 4 in the form of a hollow roll 4 is likewise identical in each case.

In the embodiment according to FIG. 6a to FIG. 6d, the two heat exchangers 6, 8 are disposed between the rows 17a, 17b of the screw connections 17. This limits the cumulative height of the heat exchangers in a vertical direction H to less than 90 mm in the present example, but in most cases allows for an extension in a longitudinal direction L, which corresponds to the total width of the cylinder head.

Moreover, this configuration provides a particularly simple option of designing both heat exchanges as varying sections of an individual heat exchanger insert, such as in the example according to FIG. 1.

The lower screw connections 17b run below the charge air duct and substantially do not collide with the housing thereof. They can cooperate at the edge of the charge air outlet 2a, for example on fastening lugs, which are not shown.

In some sections, the upper screw connections 17a run in cavities 18 in the form of corrugations, which are produced from the same material and integrally in a second diverting region 19 of the charge air duct, which additionally forms the collector region 2. In all the exemplary embodiments described, the charge air duct is made of synthetic material, so that the cavities 18 can be formed in the injection molding process.

The second diverting region 19 follows downstream of the second heat exchanger 8 and, so as to optimize the installation space, routes the charge air in a semi-circular arch around the installation space provided for the wooden roll, which is to say routing that is curved around the control element. With respect to the sense of rotation of the diversion, based on FIG. 6a first a clockwise diversion takes place in the diverting region 7, then a counterclockwise diversion at the start of the second diverting region 19, and then a clockwise diversion in the further course of the second diverting region 19, and finally again a counterclockwise diversion.

In total, good mixing of the charge air downstream of the heat exchangers 6, 8 can take place as a result of the diversions and changes in the sense of rotation.

In the exemplary embodiment according to FIGS. 7a to 7d, the first heat exchanger 6 is disposed outside of the parallel rows 17a, 17b, in the present example primarily below the lower row 17b. The lower row of screw connections 17 passes through the housing of the charge air duct between the heat exchangers 6, 8, with integral tunnel-shaped cavities being produced from the same material. In an embodiment that is not shown, the cavities can be located in a parting plane of two housing parts.

The lower, first heat exchanger 6 is designed shorter in the longitudinal direction L than the second heat exchanger 8 disposed between the screw connection rows 17a, 17b. This also applies to the length of the hollow roll 4, so that additional installation space requirements are satisfied in a slanted region 20 of the housing. In particular, the shorter, first heat exchanger can be positioned between the two lower screw connections 17b, which is to say, in an overlapping manner with the lower screw connections 17b in the lateral top view of FIG. 7b. The total height of the charge air duct in the vertical direction H can thus be kept low.

As compared to the example according to FIGS. 6a to 6d, in the example according to FIGS. 7a to 7d a larger height of the heat exchangers 6, 8 can exist notably in the vertical direction H, whereby the pressure drop is reduced.

In the example according to FIGS. 7a to 7d, it is additionally possible for the heat exchangers 6, 8 to be designed as varying sections of a single heat exchanger insert, albeit the cassette-type design is slightly more complex than the example according to FIGS. 6a to 6d.

Contrary to the preceding exemplary embodiment, in the exemplary embodiment, according to FIGS. 8a to 8d both heat exchangers 6, 8 extend over the entire longitudinal direction L, wherein the lower screw connections 17b extend between the heat exchangers 6, 8, which is to say the lower heat exchanger 6 is disposed completely below the screw assemblies 17b. In the lateral top view (FIG. 8b), the housing is shaped substantially as a U-shaped duct, wherein a free central region 21 remains and the bypass 13 is designed not only as a simple perforation of a housing wall, but rather as a short connecting duct of the hollow roll 4 to the outlet region 2.

The example according to FIG. 8a to FIG. 8d makes a particularly small drop in pressure possible, but requires a relatively large construction height.

Figure 9:
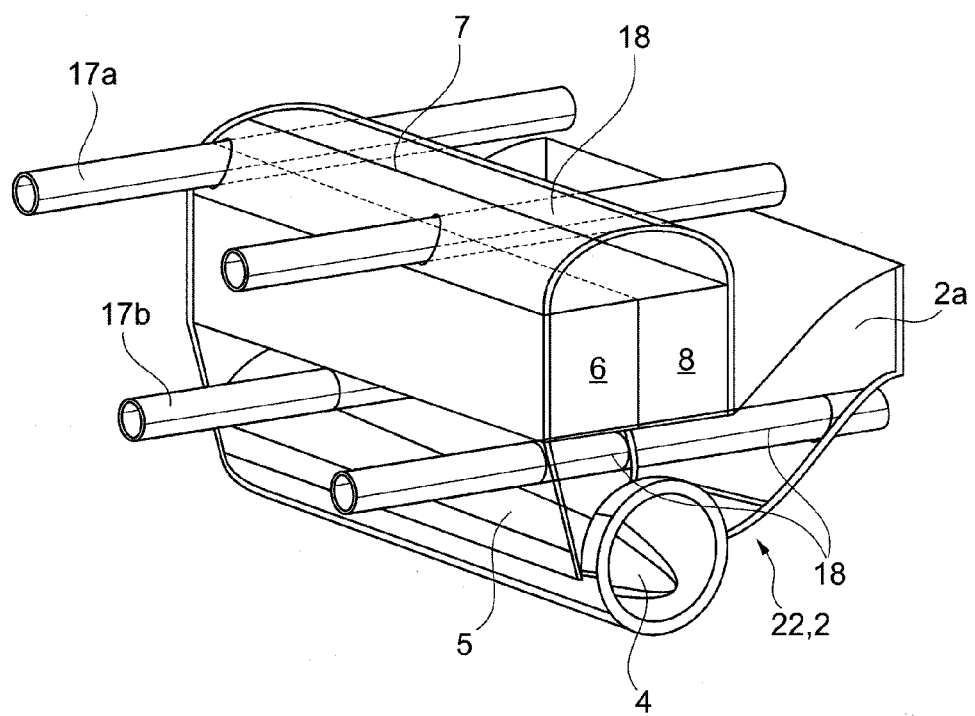
FIG. 9 shows a spatial view of an additional embodiment of the invention.

FIG. 9 shows another example in which, on an overall basis, an S-flow heat exchanger is present. The heat exchangers 6, 8 are shaped and dimensioned similarly to the example according to FIGS. 6a to 6d, but instead are arranged basically rotated by 90°. Both heat exchangers, which are notably formed as sections of a single heat exchanger insert, are disposed completely between the screw connection rows 17a, 17b. The charge air does not flow through the heat exchangers in the depth direction T, as in the other examples, but in the vertical direction H. A first diverting region 7 for a diversion by 180° is provided between the heat exchangers 6, 8, and a second diverting region 22 or collector region 2 is provided downstream of the second heat exchanger 8.

The second diverting region 22 initially diverts the charge air by more than 90° in a sense of rotation that is opposite of that of the first diverting region, whereupon a small diversion again in the opposite direction takes place. Like the second diverting region in the example of FIGS. 6a to 6d, the diverting region 22 thus has a turning point, or a point where the sense of rotation about the longitudinal direction L changes.

The upper screw connections 17a pass through tunnel-shaped cavities 18 in the first diverting region 7, which here forms the uppermost part of the charge air duct. The lower screw connections pass through tunnel-shaped cavities 18 of a connecting duct 5 between the wooden roll 4 and first heat exchanger 6 as well as tunnel-shaped cavities 18 through the second diverting region 22 or collector region 2.

The three exemplary embodiments described hereafter in accordance with FIG. 10a to FIG. 12d all relate to arrangements in which an additional heat exchanger 8 is disposed downstream of the heat exchanger 6. To this end, in each case at least one duct-shaped bypass 13 is provided, which starts at the roll-shaped control element 4 and joins downstream of the (first) heat exchanger 6, but upstream of the additional (second) heat exchanger 8. The first heat exchanger 6 is designed in each case as a high-temperature heat exchanger, which is integrated in a cooling circuit of the engine coolant. Typical coolant temperatures for an engine at the operating temperature in this example range around 90° C. The subsequent, second heat exchanger 8 is designed as a low-temperature heat exchanger, which is connected to a low-temperature branch of the cooling circuit. The coolant temperatures present in this example are considerably lower and can reach the temperature of the ambient air. As an alternative or in addition, it is also conceivable for a refrigerant of a refrigeration circuit to flow through the low-temperature heat exchanger.

An additional common feature of the exemplary embodiments according to FIGS. 10a to 12d comprises a throttle member 23, which is disposed upstream of the roll-shaped control element 4 and can be drivably adjusted by way of an electromotive actuator 23a. The throttle member 23a is disposed in the same cylindrical duct 16 as the roll-shaped control element 4 and shaped as a circular throttle blade, the shaft of which passes transversely through the cylindrical duct 16. The throttle member 23a can be used to completely block the inlet 3 or cylindrical duct 16 so that, for example in the case of a diesel engine, the engine can be shut off by way of the throttle blade. As a result, complex sealing measures can be dispensed with regarding the control element 4, which would otherwise be necessary if the objective were to achieve complete blocking capability by the control element 4 alone. Moreover, the throttle blade 23 can support the throttling setting in the range of extreme throttling, for example so as to generate sufficient negative pressure for high-pressure exhaust gas recirculation in the partial-load operating range downstream of the control element 4.

In addition, all three of the exemplary embodiments according to FIG. 10a to FIG. 12d satisfy the same spatial requirements with respect to the screw connections to the internal combustion engine as the examples according to FIG. 6a to FIG. 9 described above.

In the case of the exemplary embodiment according to FIGS. 10a to 10e, the only bypass of the charge air duct is the bypass 13 joining upstream of the additional heat exchanger 8. The charge air thus always flows through at least the additional heat exchanger 8 in any position of the control element 4.

Figure 10A:
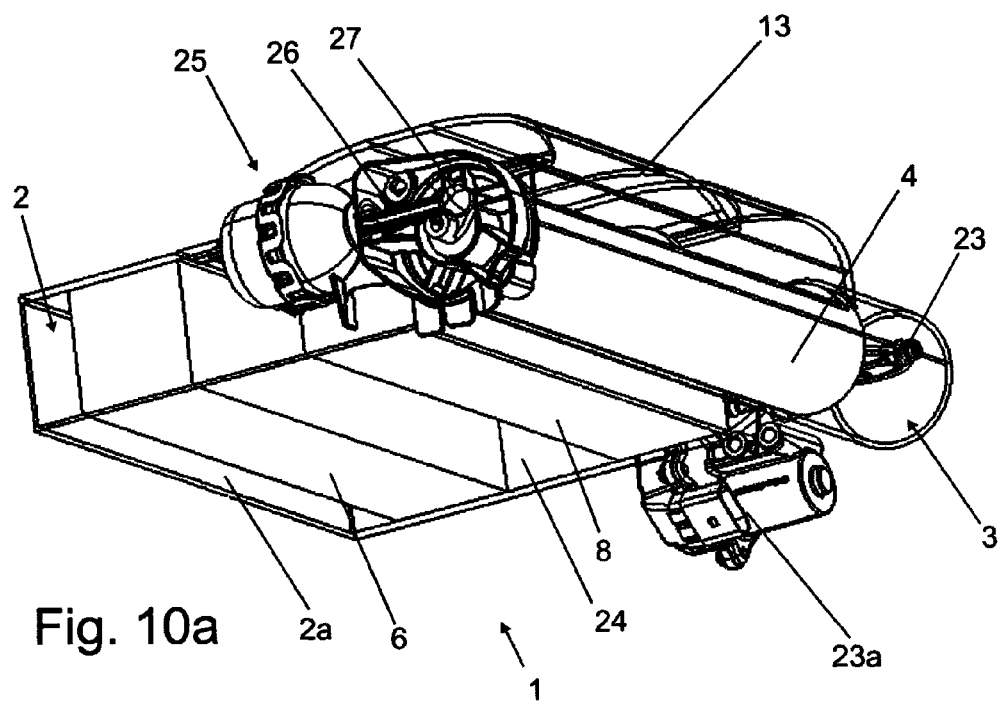
FIGS. 10a to 10e show an additional embodiment of the invention in two spatial views and in top views, from the side, the front and the back.
Figure 10B:
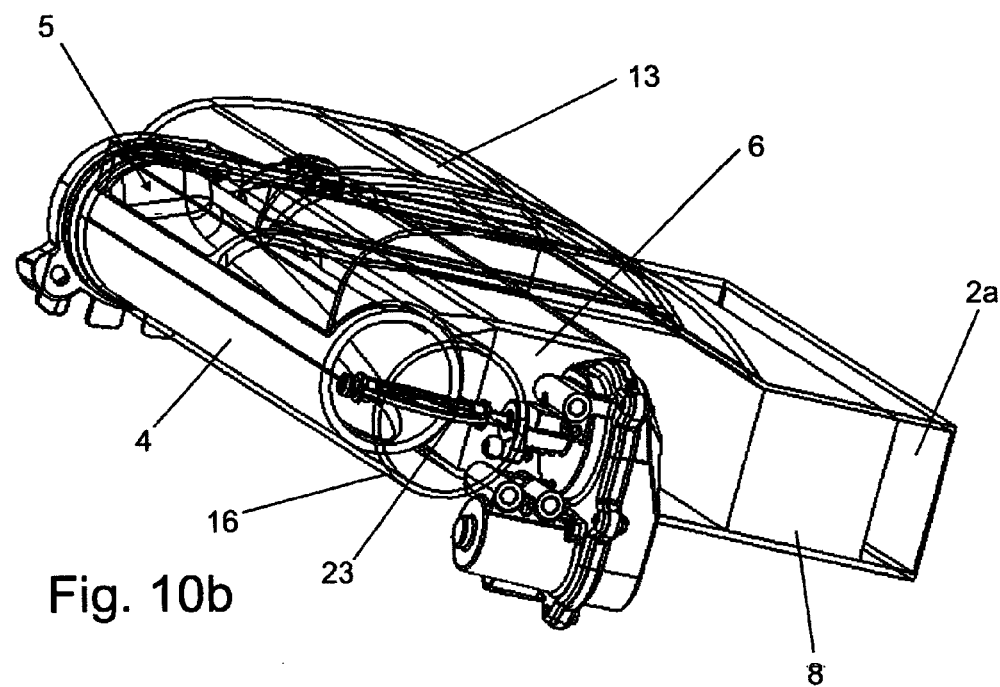
Figure 10C:
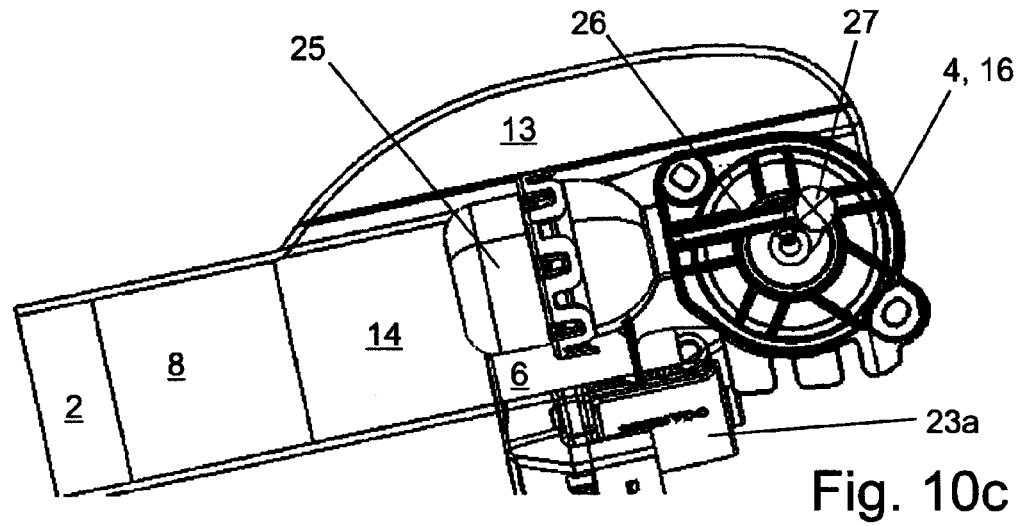
Figure 10D:
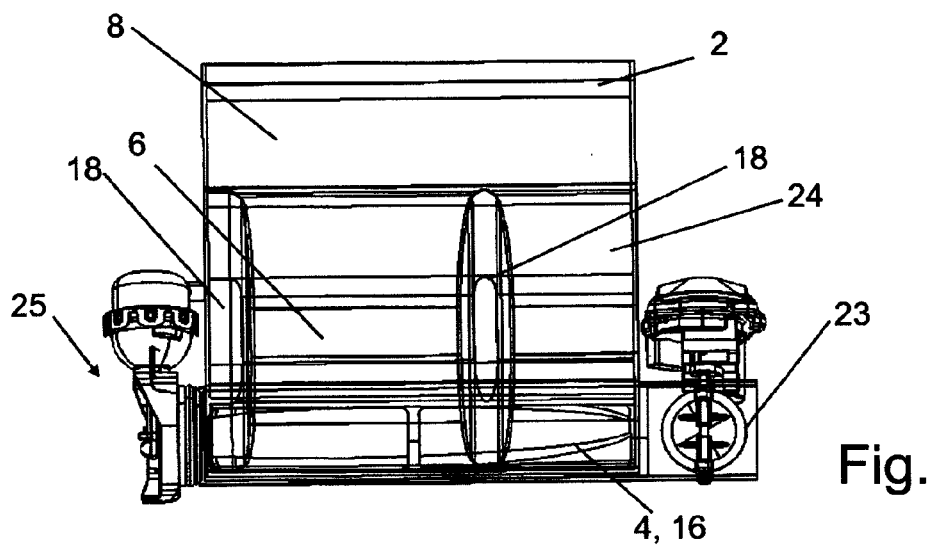
Figure 10E:
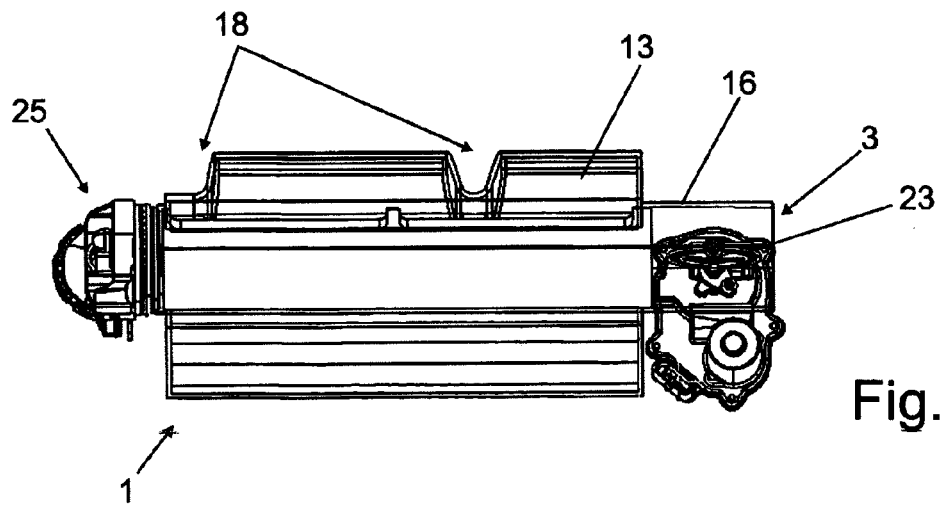
Figure 11A:
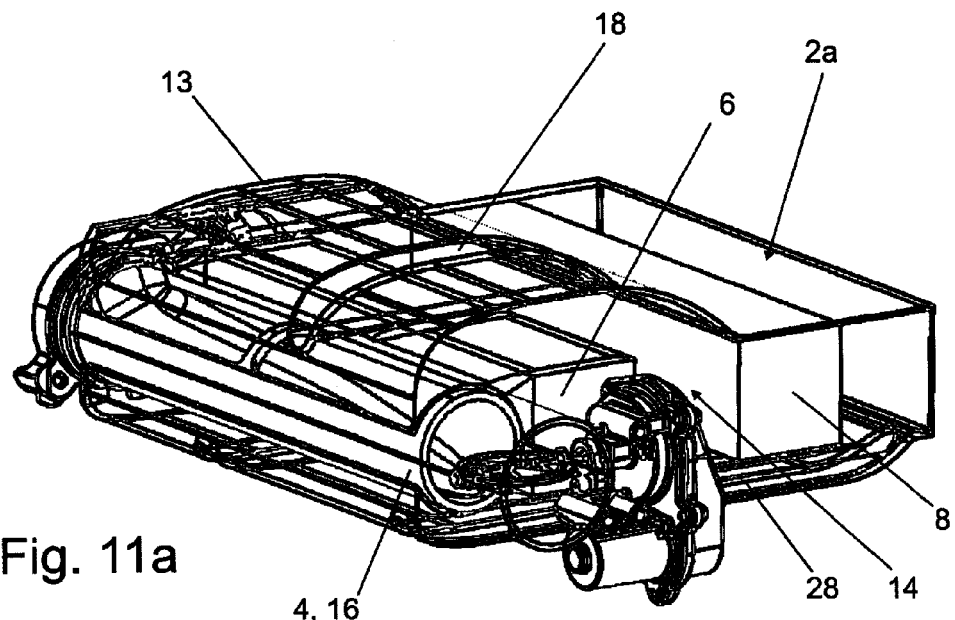
FIGS. 11a to 11d show an additional embodiment of the invention in a spatial view and in top views, from above and from the sides.
Figure 11B:
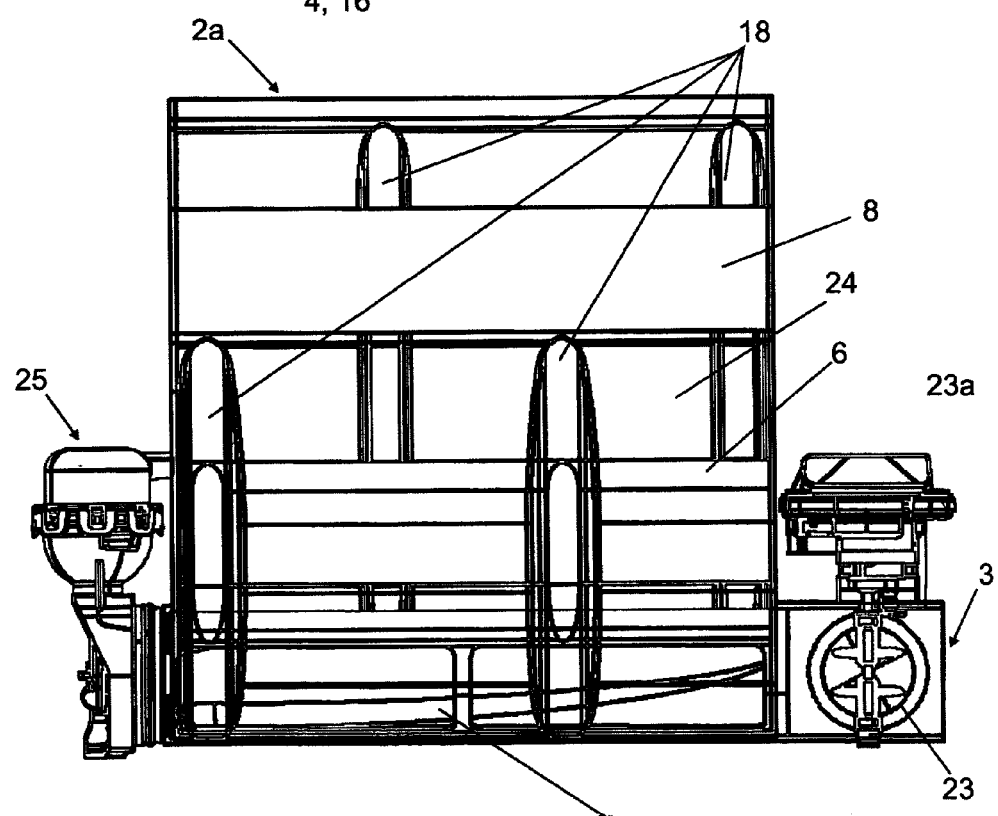
Figure 11C:
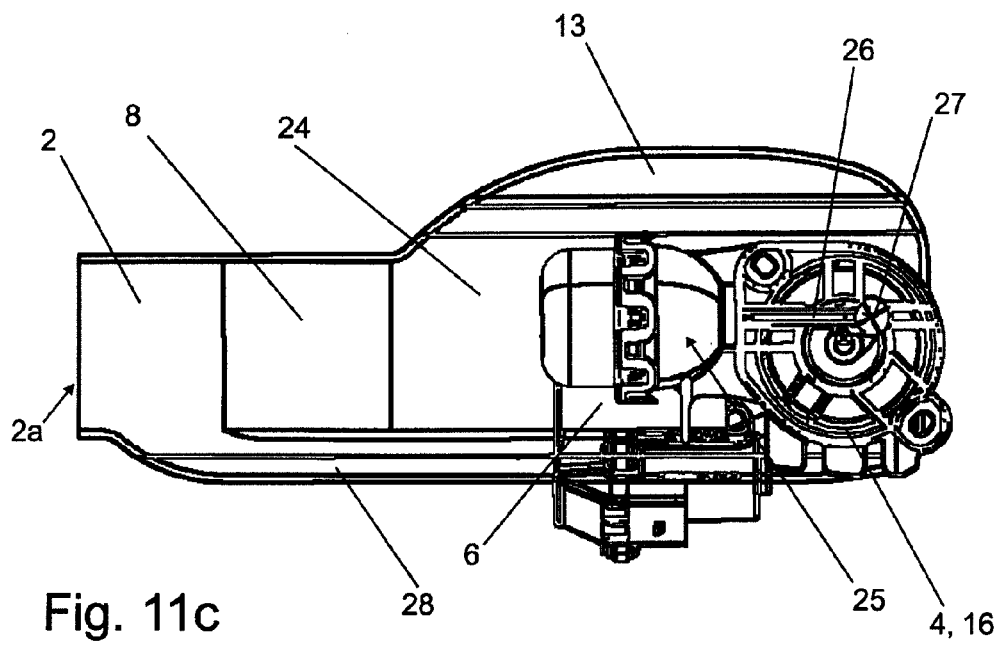
Figure 11D:
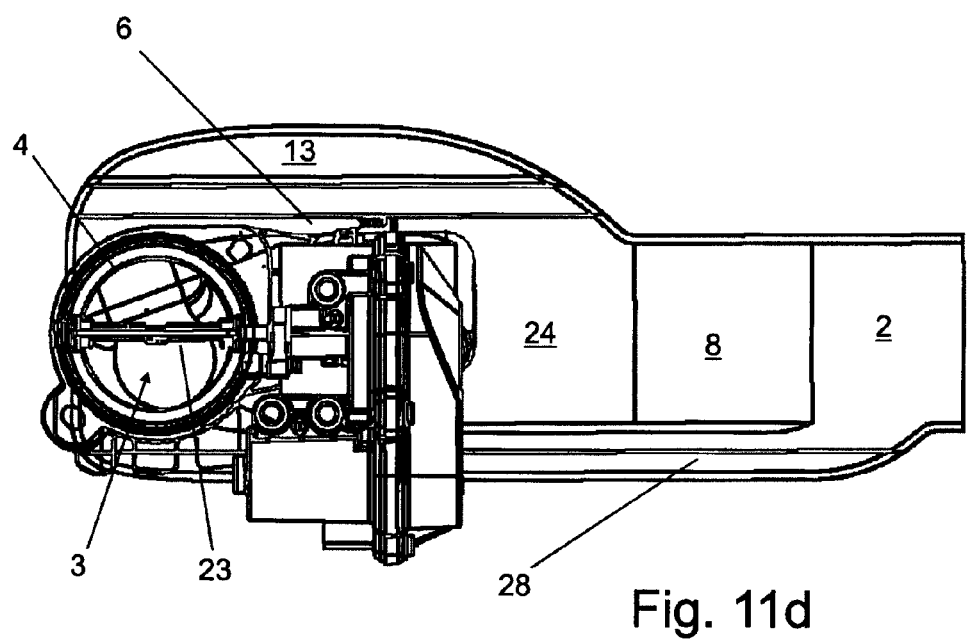
Figure 12A:
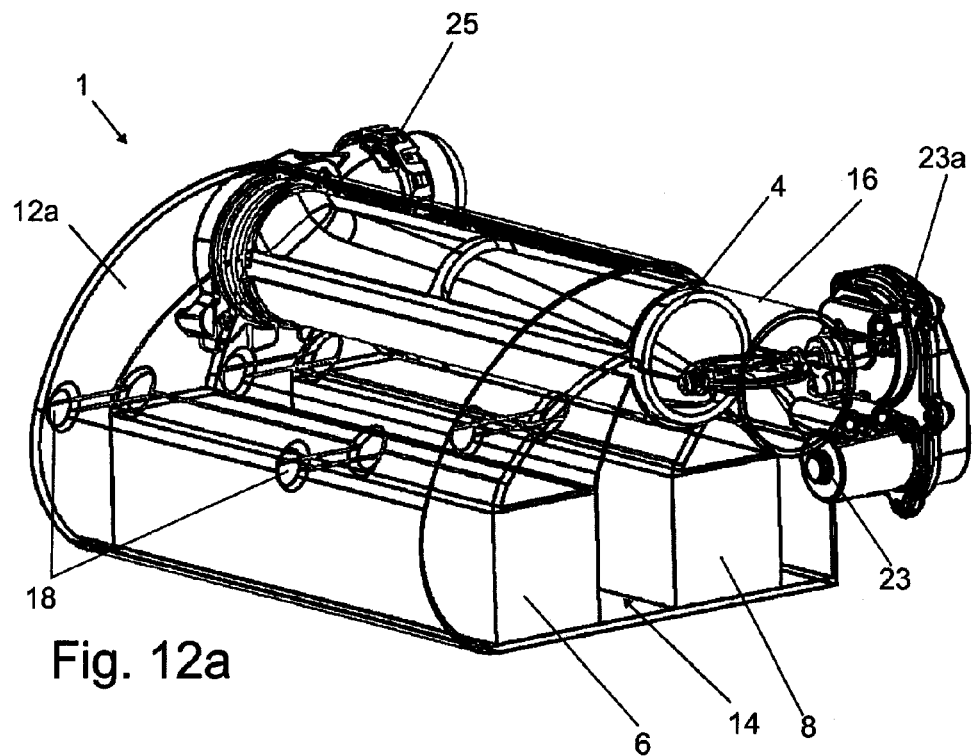
FIGS. 12a to 12d show an additional embodiment of the invention in a spatial view and in top views, from above and from the sides.
Figure 12B:
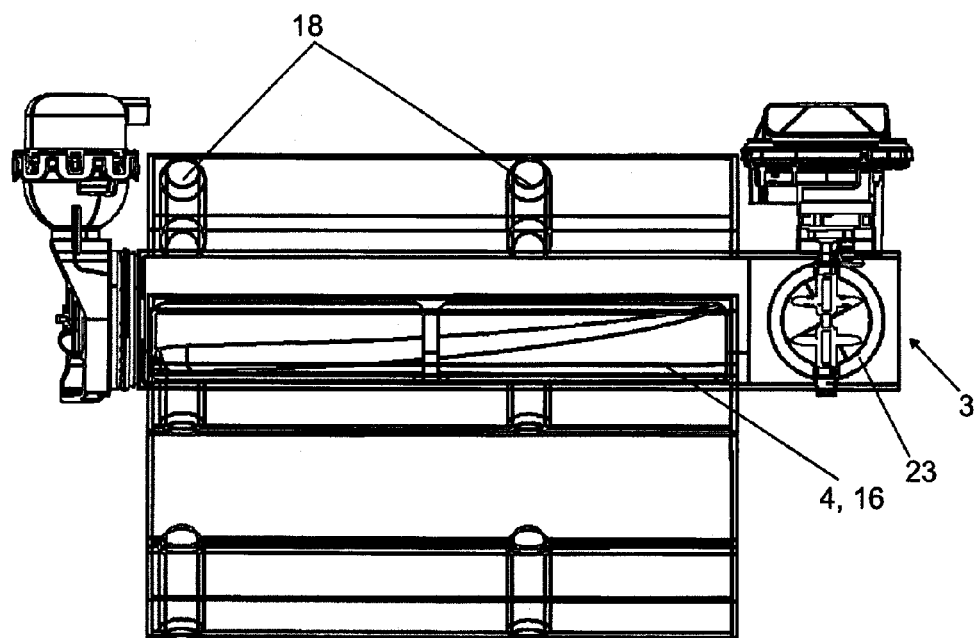
Figure 12C:
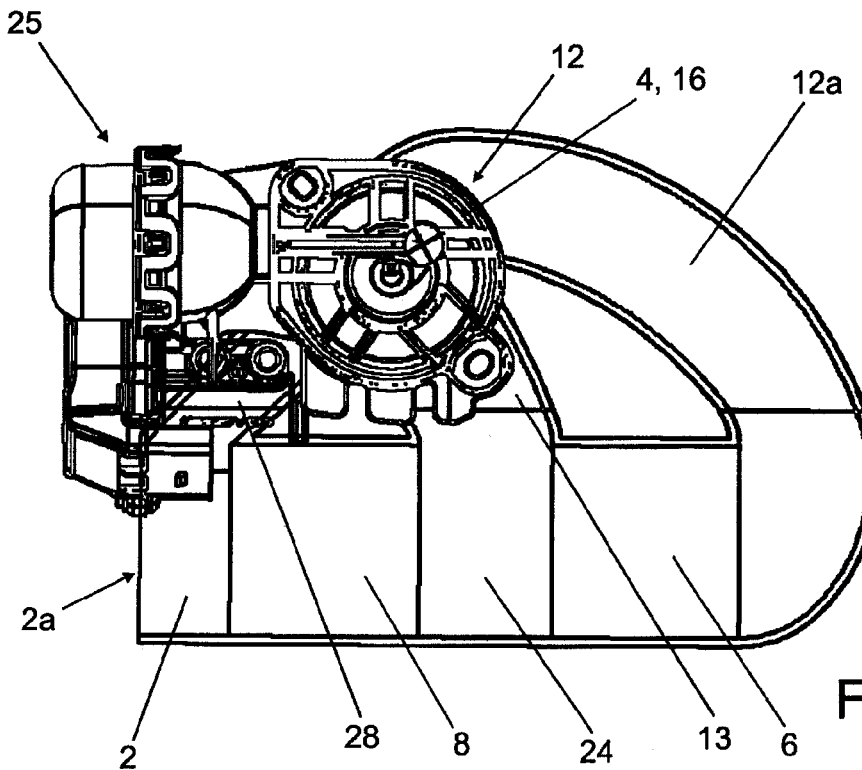
Figure 12D:
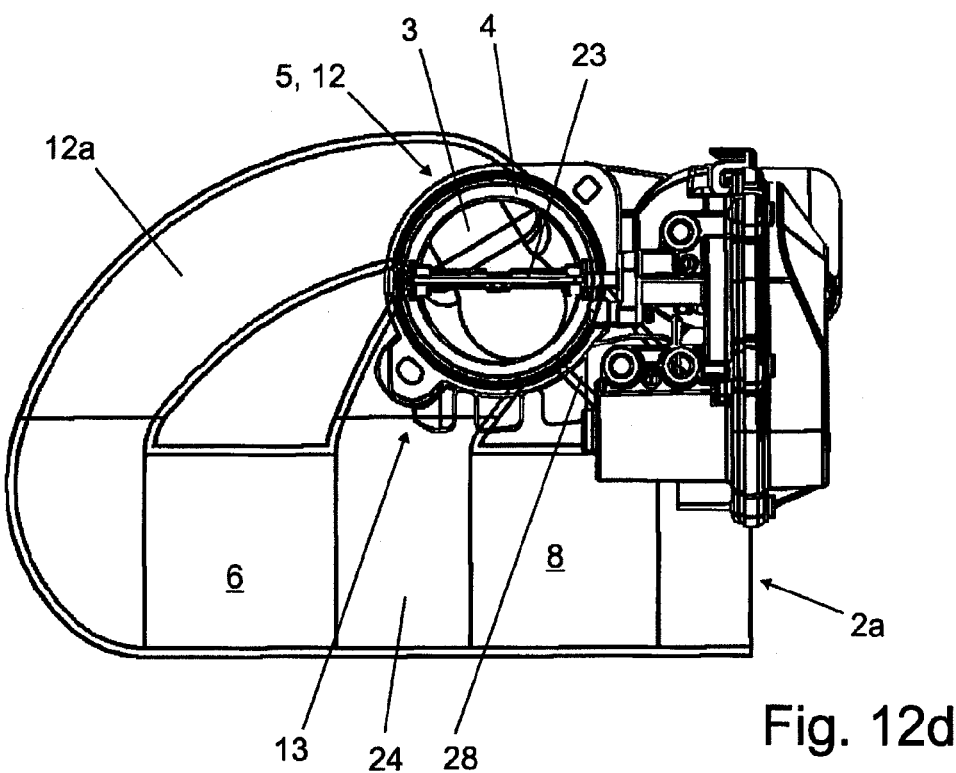

According to the lateral top view shown in FIG. 10c, the cylindrical duct 16, together with the control element 4, and the two heat exchangers 6, 8 are located substantially in one plane and are disposed one behind the other in the flow direction of the charge air. The bypass 13 is shaped as a flat, curved duct that runs above this plane and leads into an intermediate space 24 between the heat exchangers 6, 8.

The bypass 13 is designed with cavities 18 by means of which upper screw connections that pass through the housing 1 are provided, similarly to the example according to FIGS. 6a-6d. Lower screw connections run completely beneath the housing 1, which is likewise analogous to the example according to FIGS. 6a to 6d.

Moreover, an electromotive actuator 25 for actuating the control member 4 is disposed laterally on the housing 1 and on the end region of the cylindrical duct 16 which is located opposite of the throttle member 23. The actuator 25 comprises a linearly displaceable rod 26, which is connected, by way of a ball head mounting, to a pin 27 of the roll-shaped control element arranged eccentrically with respect to the rotational axis of the roll 4. The pin 27 is adjusted by means of the driven movement of the rod 26, and the roll of the control member 4 is adjusted by means of the pin, whereby the various aforementioned ways of routing the charge air can be adjusted.

Contrary to the example according to FIG. 10a to FIG. 10e, an additional, second bypass 28 is present in the exemplary embodiment according to FIGS. 11a to 11d. The arrangement of the control element 4 and of each of the heat exchangers 6, 8 in one plane has been preserved, as has been the arrangement of the first bypass duct 13 above this plane. The additional bypass duct 13 is now moreover provided beneath the plane in a flat design that is similar to the first duct and extends over the width of the housing 1. The second bypass 28 joins downstream of the two heat exchangers 6, 8, whereby routing of the charge air with complete circumvention of all heat exchangers 6, 8 is made possible.

Analogously to the first bypass duct 13, the second bypass duct 28 has cavities 18 in which the lower screw connections of the charge air duct to the internal combustion engine are disposed.

Overall, the control element according to the exemplary embodiment according to FIGS. 11a-11d thus has an additional fourth position, in which the charge air is routed through the second bypass 28 with complete circumvention of the heat exchangers 6, 8. As before, the charge air is routed from the inlet 3 through all the heat exchangers 6, 8 to the outlet 2a in the first position defined by the invention. In the second position, the charge air is routed through the (first bypass) 13 with at least partial circumvention of the heat exchanger, in the present example with complete circumvention of the first heat exchanger 6. Deliberate throttling of the charge air that is routed through both heat exchangers takes place in the third position of the control element 4.

In very general terms, of course, deliberate throttling of the charge air can also be adjusted, depending on the requirements, with respect to the second and/or fourth positions, which is to say the routing of the charge air through a bypass 13, 28.

FIGS. 12a to 12d show an additional exemplary embodiment of the invention, in which, as in the preceding example according to FIGS. 11a-11d, a second bypass 28 and, in overall terms, an identical function of the charge air duct are present. Contrary to the preceding example, the spatial arrangement of the components in the housing is different, resulting in a higher and shorter configuration, which may be advantageous, depending on the requirements.

To this end, the two heat exchangers 6, 8 and the outlet 2a are also arranged in one plane one behind the other. The control element 4 is not disposed in this plane, but above. Three ducts branch in a fan-like manner off the cylindrical duct 16 of the control element 4, these being a main duct 12a for routing the charge air through the two heat exchangers 6, 8, the first bypass duct 13 for routing the charge air from the inlet 3 to the intermediate space 24 between the heat exchangers 6, 8, and the second bypass duct 28 for routing the charge air from the inlet 3 to the outlet 2a, completely circumventing both heat exchangers 6, 8.

Similarly to the examples according to FIGS. 7a-7d or FIGS. 8a-8d, tunnel-shaped cavities 18 are present here for a row of screw connections which pass through the housing 1 between the plane of the control element and the plane of the heat exchangers 6, 8. In an alternative design, the control element can be disposed below the heat exchangers 6, 8, rather than above the heat exchangers 6, 8 (for example, by rotating the device by 180°).

Figure 13:
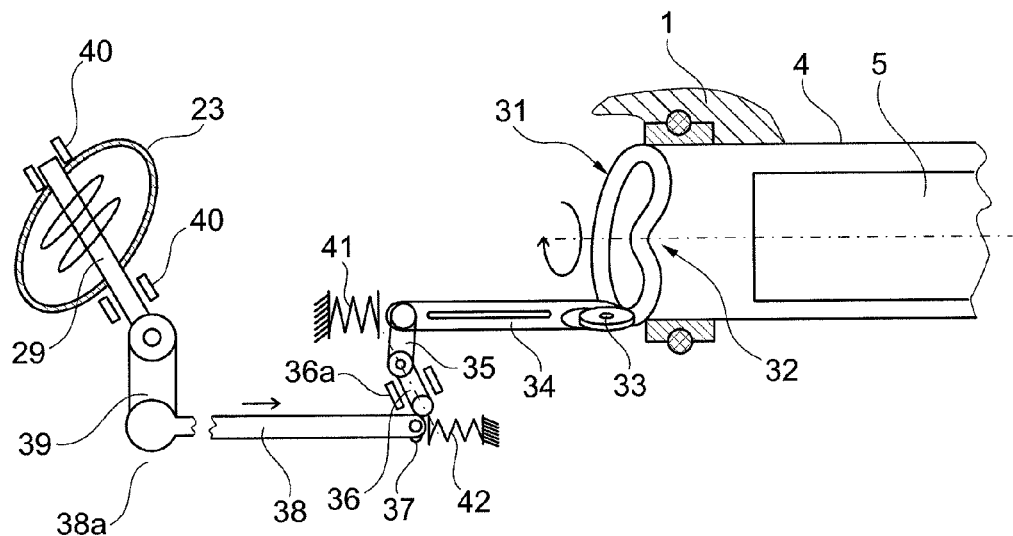
FIG. 13 is a sketch of a coupling mechanism of the throttle member and control element of another embodiment of the invention.

FIG. 13 shows another embodiment of the invention in which, as in the examples according to FIG. 10a to FIG. 12d, a throttle member 23 is provided in addition to the control element 4. As in the preceding examples, the throttle member 23 is shaped as a throttle blade that is fixed on a shaft 29, wherein the shaft 23b can be drivably rotated.

Contrary to the aforementioned exemplary embodiments, however, the shaft 29 is not driven by means of a dedicated actuator (see, for example, actuator 23a in FIG. 10a), but by the movement of the control element 4 which is driven by means of the actuator 25 and which is transmitted to the throttle member 23 by way of a coupling mechanism 30.

The coupling mechanism 30 functions as follows:

A cam or a slotted structure 32, against which a sliding block 33 of a push rod 34 that is movably mounted only in the longitudinal direction thereof, is seated against an end face 31 of the roll-shaped control element 4. The opposite end of the push rod 34 is coupled to a rotating arm 35, which transmits a linear movement to the shaft 36 as a rotary movement. The shaft 36 is guided out of the housing 1 by way of a sealing pivot bearing 36a and transmits the rotary movement to a rotating aim 37 and an arm 38, which in turn drives a rotary arm 39 by way of a ball joint 38a. The rotating arm 39 is rigidly connected to the shaft 29 of the throttle blade 23 which leads back into the housing 1, or the charge air duct, via a sealing pivot bearing 40.

A first spring 41 and a second spring 42 ensure that the play is compensated for and that a force is applied to the throttle blade 23 in the closing direction.

In the overall, the throttle blade can thus be closed directly as a function of the position of the control element 4. By suitably shaping the slotted structure 32, the throttle blade 23 can, for example, be closed only in a direct end region of an adjustment of the control member 4, as needed.

Figure 14:
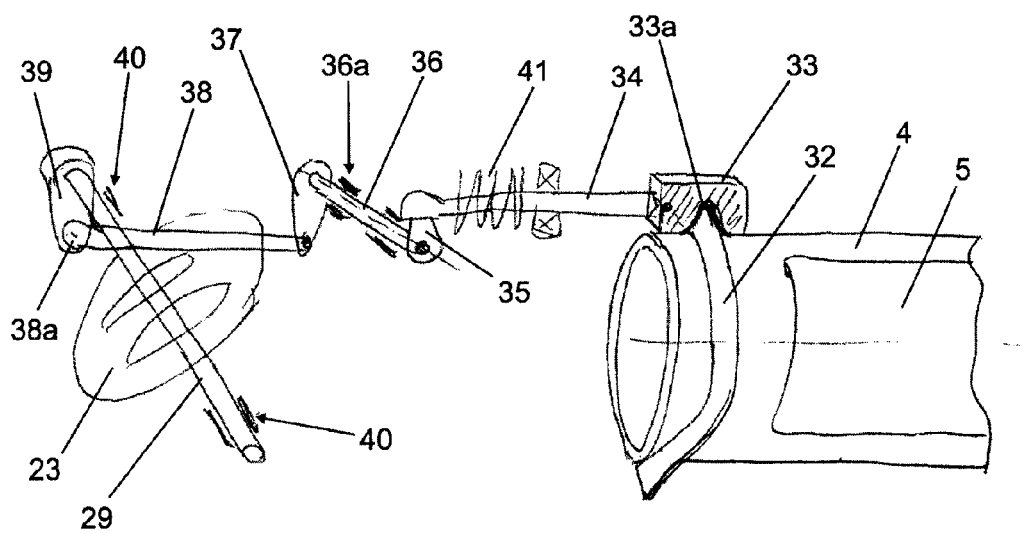
FIG. 14 is a sketch of a modification of the coupling mechanism of FIG. 13.

FIG. 14 shows a modification of the coupling mechanism 30 of FIG. 13. Contrary to FIG. 13, the sliding block is forcibly guided here in two directions by meshing, by way of a groove 33a, with a slotted structure 32, which in the example here is designed as a radially projecting rail on the circumference of the roll-shaped control element 4. Because the forcible guidance of the sliding block is more extensive than in FIG. 13, one of the two springs 41, 42 can be dispensed with. Aside from this, the movement of the sliding block 33 is transmitted to the throttle blade 23 in substantially the same manner as in the example according to FIG. 13.

Figure 15:
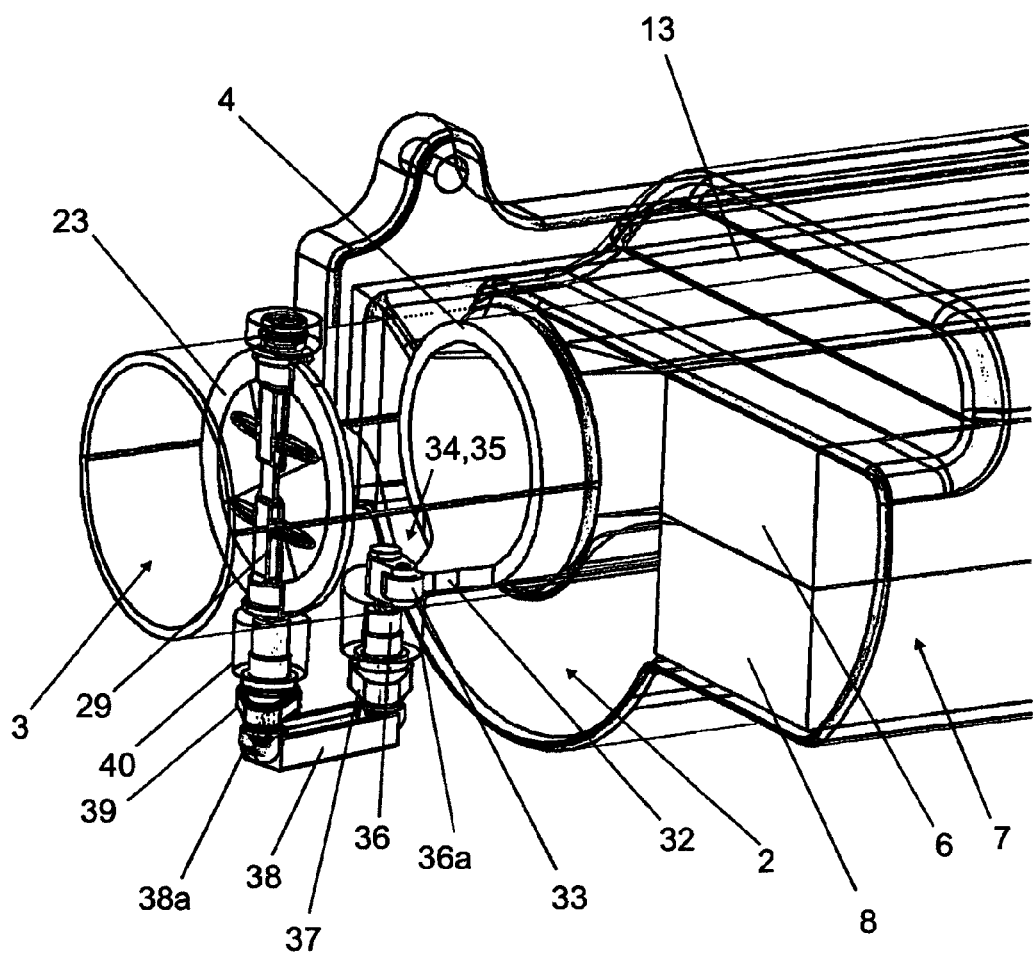
FIG. 15 shows a detailed variant of a coupling mechanism based on the example of FIG. 13.

The detailed variant of a coupling mechanism shown in FIG. 15 is based on the example of FIG. 13, wherein the movement of the roll-shaped control element is transmitted to the sliding block 33 by means of a cam 32 located at the end face.

It shall be noted that the mechanism here is shown in conjunction with the example of a further housing shape, which has not been shown above. The housing comprises a diverting region 7 between the two heat exchangers, with a (second) bypass 13 by which the upstream heat exchanger 6 can be circumvented leading into this region. Moreover, the roll-shaped control element 4 can also route the air flow directly into the collector region or outlet 2, circumventing both heat exchangers 6, 8, analogously to the position according to FIG. 4 in the first exemplary embodiment. Thus, two bypasses that can be alternatively selected are present.

The characteristics of the individual exemplary embodiments can, of course, be arbitrarily combined with each other, depending on the requirements. For example, the additional throttle member 23 can be provided on each of the aforementioned exemplary embodiments in each of the variants described, notably with or without coupling mechanism.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A charge air duct for an internal combustion engine, comprising
    a housing which has at least one inlet and at least one outlet for charge air, a heat exchanger for cooling the charge air and being disposed in the housing and an additional heat exchanger for cooling the charge air and being disposed in the housing, the additional heat exchanger positioned downstream from the heat exchanger, a bypass for at least partially circumventing the heat exchanger and the additional heat exchanger, the bypass being disposed in the housing, a control element for influencing the charge air flow being disposed in the housing, in a first position of the control element, the charge air being routed from the inlet to the heat exchanger and the additional heat exchanger, and in a second position of the control element, the charge air being routed from the inlet to the bypass, wherein in a third position, the control element forms an at least partial reduction of a passage cross-section for the charge air, and the housing comprises a U-shaped diverting region for diversion of the charge air, wherein the diverting region is disposed downstream of the heat exchanger and upstream of the additional heat exchanger.

2. The charge air duct according to claim 1, wherein the charge air duct is designed as an intake manifold of the internal combustion engine.

3. A charge air duct according to claim 1, wherein the control element is disposed in a substantially cylindrical duct, wherein the charge air flow is diverted by approximately 90° in the region of the duct.

4. A charge air duct according to claim 1, wherein the control member is designed as a roll that can be rotated about an axis.

5. A charge air duct according to claim 1, wherein the control member comprises a blocking surface, wherein the blocking surface has a geometric structure so as to reduce the passage cross-section.

6. A charge air duct according to claim 1, wherein the housing is composed of at least two housing parts.

7. A charge air duct according to claim 1, wherein a tie rod is provided on the housing, wherein the tie rod effects a reinforcement of a housing wall in the region of a gasket of the control member.

8. A charge air duct according to claim 1, wherein the control member is slidingly seated against at least one gasket.

9. The charge air duct according to claim 8, wherein the gasket is integrally cast with the housing.

10. A charge air duct according to claim 1, wherein the housing has a multi-wall design, at least in some sections, wherein a coolant flows between the housing walls.

11. A charge air duct according to claim 1, wherein the housing can be fixed to the internal combustion engine by way of two parallel rows of screw connections, wherein at least one of the screw connections passes through a part of the housing.

12. The charge air duct according to claim 11, wherein the heat exchanger is disposed between the parallel rows of screw connections.

13. The charge air duct according to claim 12, wherein an additional heat exchanger is provided, wherein the additional heat exchanger is disposed either between the parallel rows of screw connections or outside of the parallel rows of screw connections.

14. The charge air duct according to claim 13, wherein the heat exchangers have either varying lengths, or the same length, in a longitudinal direction transversely to the flow direction.

15. The charge air duct according to claim 13, wherein the charge air flow undergoes a diversion, of about 180°, after the upstream one of the two heat exchangers and before the downstream one of the two heat exchangers.

16. The charge air duct according to claim 15, wherein the charge air flow undergoes an additional diversion in a second diverting region, downstream of the two heat exchangers, in the manner a routing that is curved around the control element, or in the manner of a diversion by at least 90°.

17. A charge air duct according to claim 11, wherein the number of screw connections is either four or five.

18. A charge air duct according to claim 11, wherein a cavity is produced from the same material and integrally with the housing for the screw connection that passes through the housing in the manner of a groove or a tunnel.

19. A charge air duct according to claim 1, wherein, in addition to the control element, a throttle member is provided, by means of which in particular complete blockage of the charge air can be adjusted.

20. The charge air duct according to claim 19, wherein the throttle member comprises an electrically controllable actuator, which is provided in addition to an electrically controllable actuator of the control element, wherein the electrically controllable actuators of the throttle member and control element are directly coupled to each other electrically.

21. The charge air duct according to claim 19, wherein the throttle member and the control element are connected to each other by a coupling mechanism.

22. A charge air duct according to claim 1, wherein an additional heat exchanger is provided downstream of the heat exchanger, wherein in the second position, the charge air is routed through the bypass, circumventing the heat exchanger, and subsequently flows through the additional heat exchanger.

23. The charge air duct according to claim 22, wherein the heat exchanger is designed as a high-temperature heat exchanger and the additional heat exchanger is designed as a low-temperature heat exchanger.

24. The charge air duct according to claim 22, wherein, in a fourth position of the control element, the charge air is routed from the inlet to a second bypass, wherein the second bypass joins downstream of the additional heat exchanger.

25. A charge air duct according to claim 22, wherein, the control element is disposed substantially in one plane with the two heat exchangers, and also in a plane with the outlet of the charge air duct.

26. A charge air duct according to claim 22, wherein, the two heat exchangers and the outlet are disposed substantially in one plane, and wherein the control element is disposed outside of this plane and completely above or completely below the plane.

27. A charge air duct for an internal combustion engine, comprising a housing having an inlet and an outlet and a passage from the inlet to the outlet for charge air;

a heat exchanger disposed in the passage and an additional heat exchanger disposed in the passage downstream from the heat exchanger;

a bypass in the housing connecting the inlet to the outlet and bypassing the passage; and a control element in the housing having a first position for guiding charge air from the inlet to the outlet via the passage and a second position for guiding charge air from the inlet to the outlet via the bypass, wherein the housing comprises a U-shaped diverting region for diversion of the charge air, wherein the diverting region is disposed downstream of the heat exchanger and upstream of the additional heat exchanger.

28. The charge air duct according to claim 27, wherein the control element has a third position for substantially blocking charge air flow from said inlet to said outlet.

* * * * *